United States Patent [19]
Yzerman

[11] 3,765,094
[45] Oct. 16, 1973

[54] STEREO-PHOTOGRAMMETRIC SYSTEM
[75] Inventor: Henk Yzerman, Russikon, Switzerland
[73] Assignee: Bausch & Lomb Incorporated, Rochester, N.Y.
[22] Filed: Aug. 14, 1970
[21] Appl. No.: 63,854

[52] U.S. Cl. .................. 33/1 A, 33/20 D, 353/6
[51] Int. Cl. .................................. B43l 13/20
[58] Field of Search ............ 33/20 D, 1 A; 353/5, 353/6, 7

[56] References Cited
UNITED STATES PATENTS
3,088,209   5/1963   Schwidefsky et al. ............ 33/20 D
3,170,238   2/1965   Yzerman ............................ 33/20 D
3,355,807   12/1967  Schoeler et al. .................. 33/20 D
3,486,820   12/1969  Blachut et al. .................... 353/6 X FOREIGN PATENTS OR APPLICATIONS
188,044   4/1967   U.S.S.R. .......................... 33/1 A Primary Examiner—William D. Martin, Jr.
Attorney—Frank C. Parker and Saul A. Seinberg

[57] ABSTRACT

Stereo-photogrammetric method and apparatus for the metric evaluation and restitution of stereoscopic photographs of an object in numerical and graphical displays.

17 Claims, 19 Drawing Figures

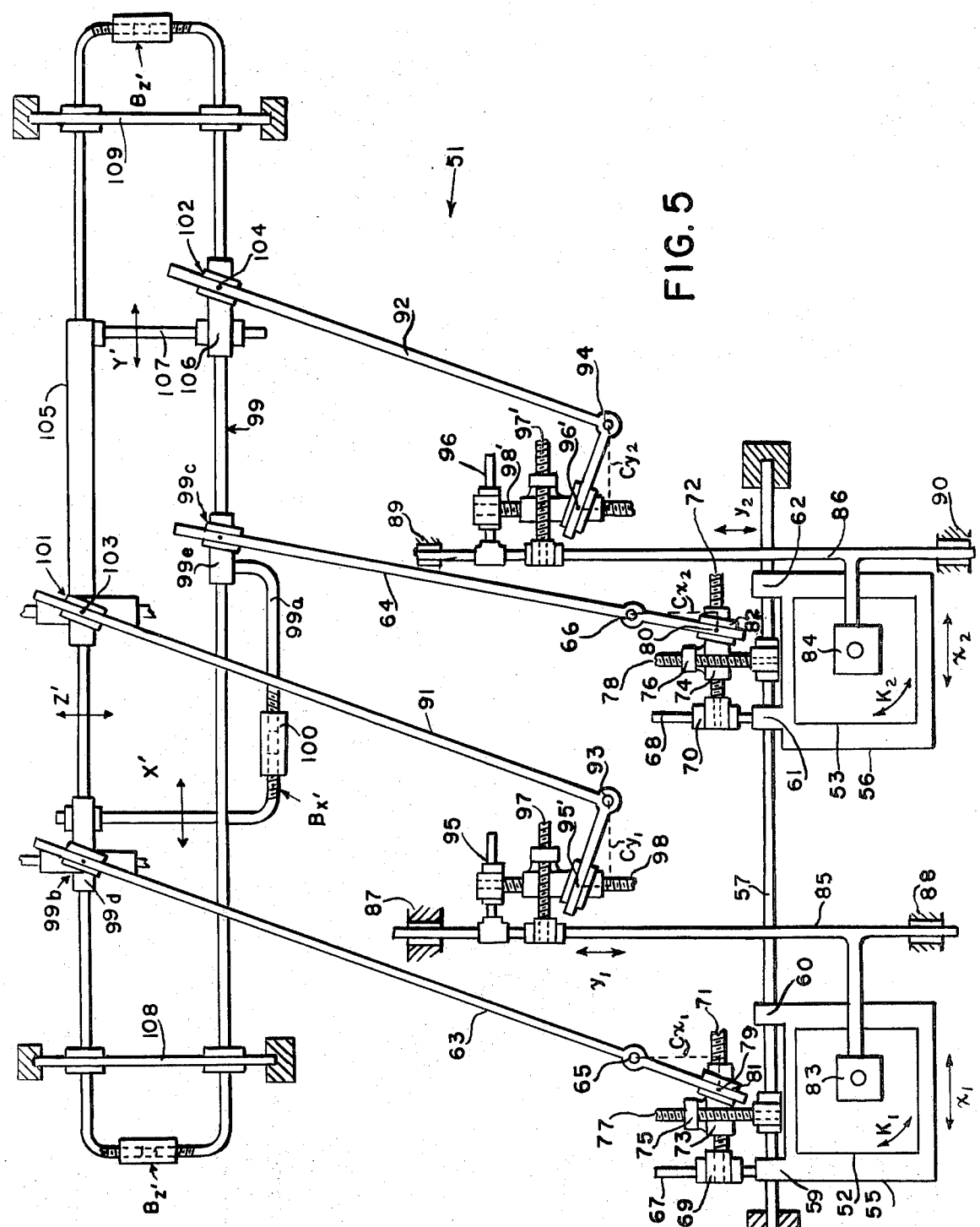

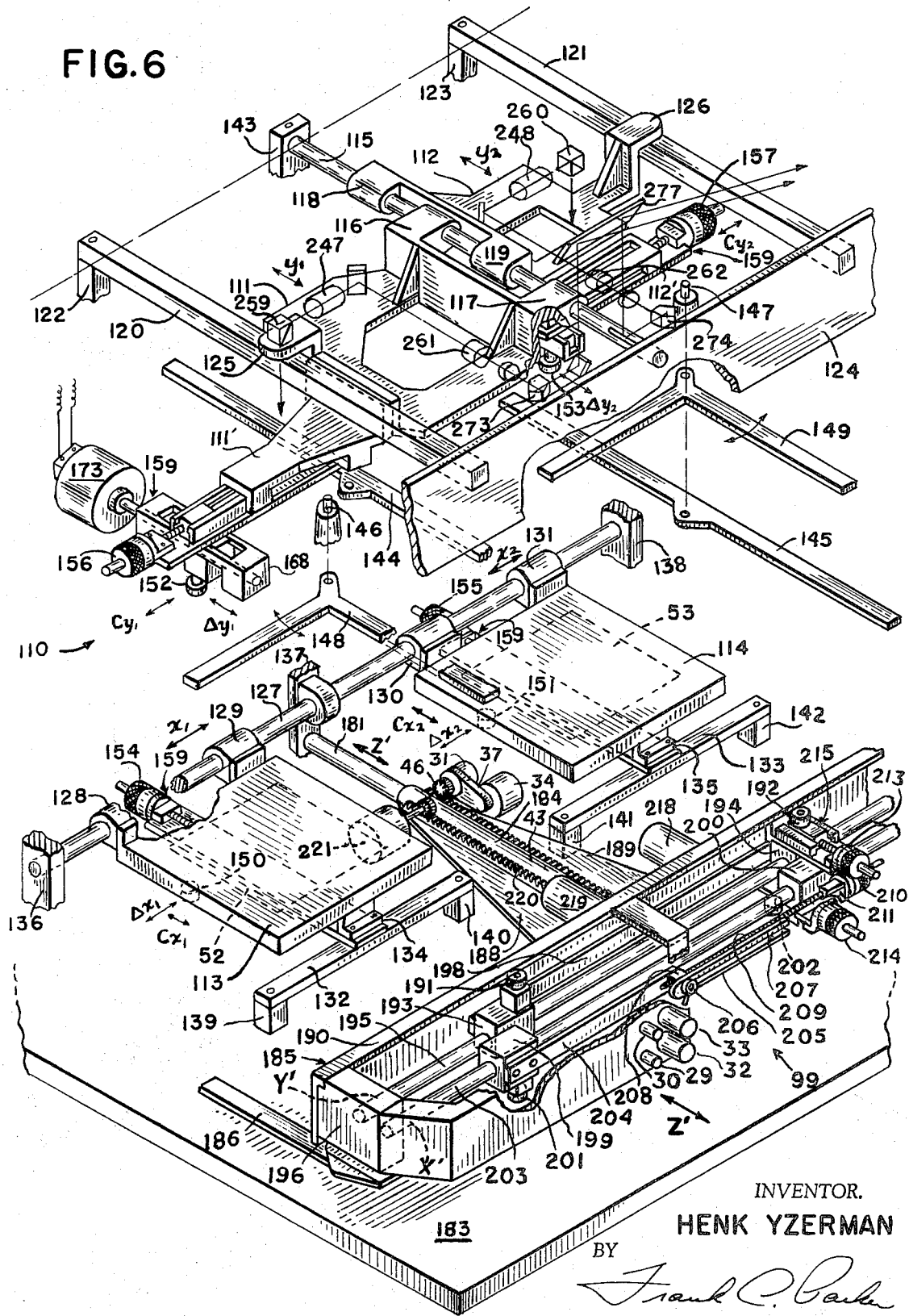

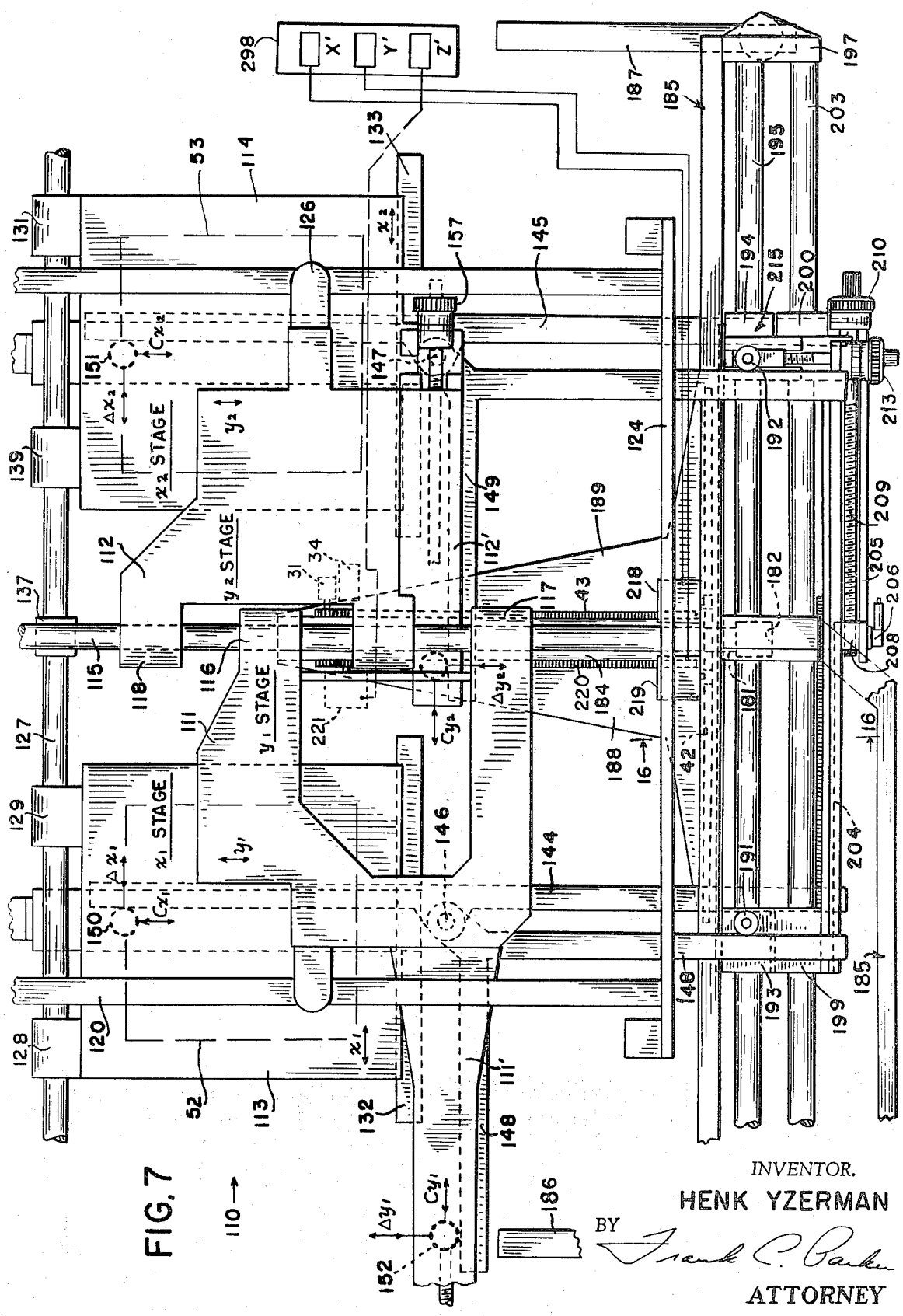

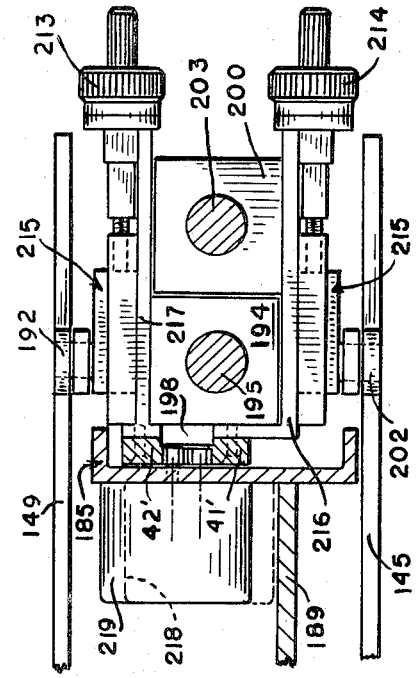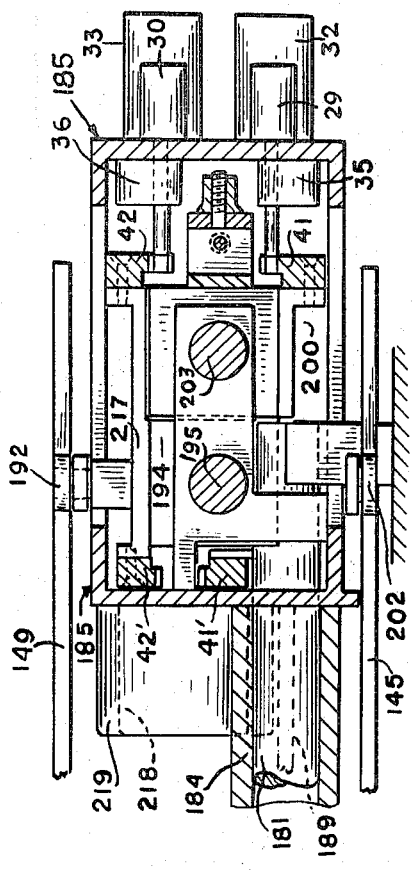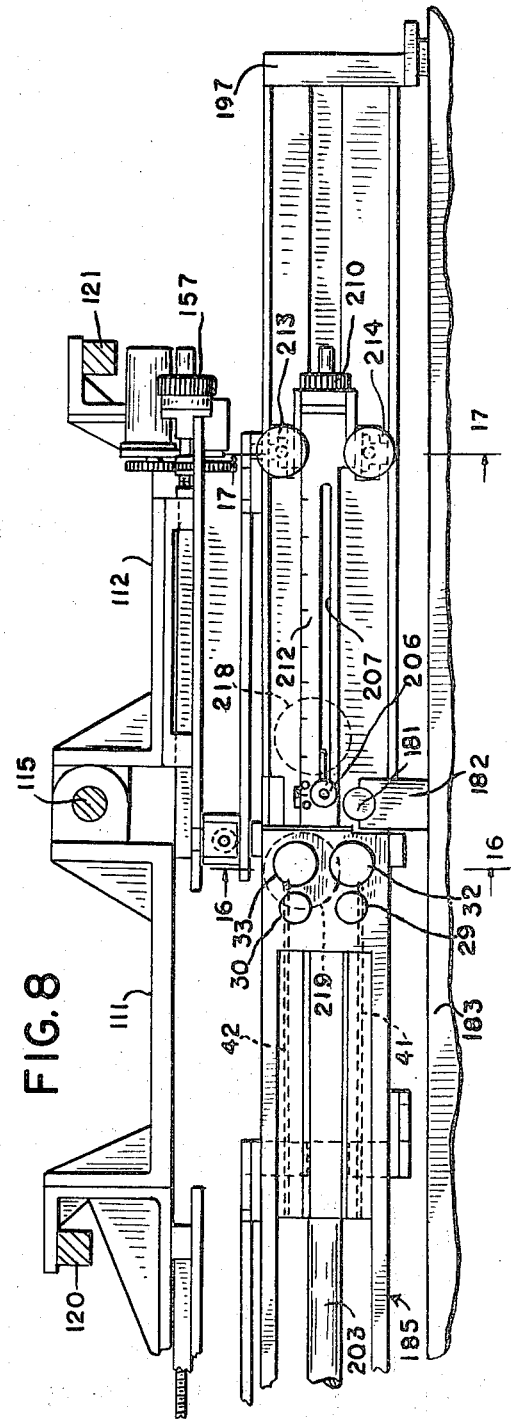

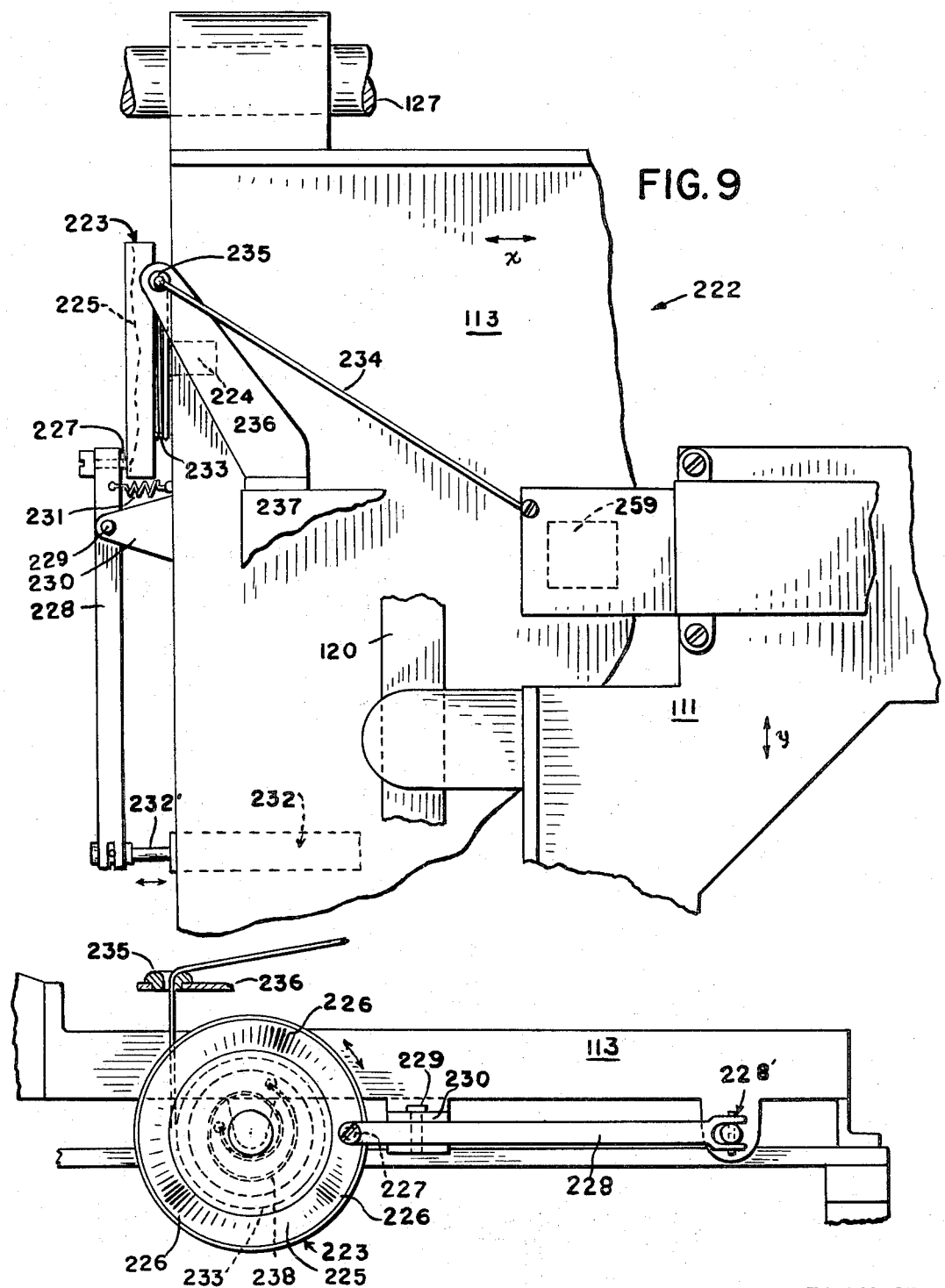

INVENTOR.
HENK YZERMAN

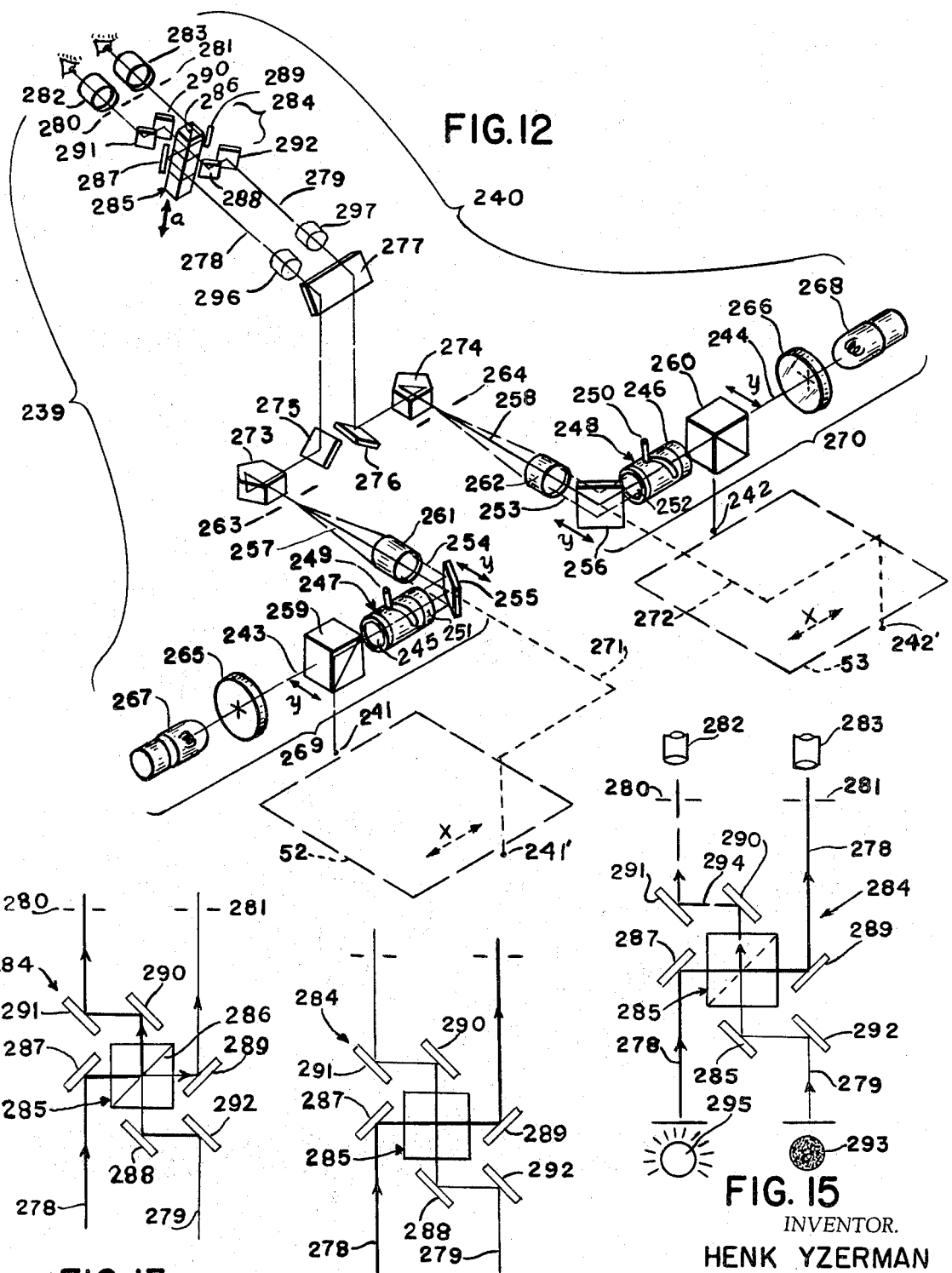

STEREO-PHOTOGRAMMETRIC SYSTEM

BACKGROUND OF THE INVENTION

The present invention relates generally to photogrammetric apparatus and more particularly it relates to a method and apparatus for the metric evaluation or restitution of stereoscopic photographs of an object in numerical and graphical displays.

Basically, the present invention follows the principles taught in the prior art described in U.S. Pat. No. 1,090,494 issued Mar. 17, 1914 to E. Von Orel and in the U.S. Pat. No. 1,477,082 issued Dec. 11, 1923, to W. Sander. This type of solution was originally designed with the intention of mapping from parallel-axis terrestrial photographs but restitution of aerial photography was impractical using the same principles, due to the tip, tilt, and rotation of even near-parallel photographs which results from variations in the attitude of the airborne camera platform.

These instruments involved certain mechanisms and movements, the essential elements being:
1. Movement of the stereopair of photographs in $x$ direction and movement of the optics for orthogonal observation in $y$ direction.
2. Independent components of space rods operate as deflectible levers in the XZ and YZ planes.
3. Independent principal distances for $x$ and $y$ directions of each of the stereopair of photographs.
4. Inclusion of correctors to vary the principal distances as a function of tips and tilts of the photographs.

A successful adaptation of these elements to the restitution of aerial photographs is described in U.S. Pat. No. 3,170,238 issued Feb. 23, 1965, to H. Yzerman.

The present invention represents a further development beyond the art above cited wherein the mechanical space rod components remain undeflected and corrections for the principal distances and decentrations of the photographs are introduced in lieu of deflections of the space rod components to compensate for the tip, tilt and rotation of near-parallel photographs.

SUMMARY OF THE INVENTION

The present invention relates to a stereo-photogrammetric method and apparatus for effecting certain operations which collectively and in combination serve to metrically evaluate and restitute stereoscopic photographs of an object in numerical and graphical displays.

It is an object of the present invention to provide a novel stereo-photogrammetric system of modular design wherein each of the component modules serves a different function of the system and satisfies with progressive combinations, a higher state of the photogrammetric art requirements in the aforesaid metric evaluations.

It is an object to provide a stereo-photogrammetric system having basic modules which are relatively simple in form and precise in operation, consequently providing a near optimum accuracy of results obtained therefrom.

An object is to provide such a device wherein versatility of use of the component modules is paramount, and wherein economies in manufacture are effected while achieving the aforesaid superior accuracy of performance.

A further object is to provide such a device which is mechanically compact so that space requirements, particularly in the vertical dimension, are greatly reduced, the device being light of weight to provide easy transportability.

It is a further object to provide such a device in which the function of the projections of the so-called space rods employed in prior art stereo-restitution instruments is augmented without angular deflections thereof, and the principal distances as well as the decentrations may be independently adjusted for the $x$ and $y$ directions of each photograph.

It is a further object to provide such a device embodying a mechanical setting device having an electrical output for the correction of a wide range of radial distortions of the aforesaid stereo-photographs.

Another object is to provide such a device having a numerical display and registration of coordinates and having a graphical display on a coordinatograph.

Another object is to provide such a device which features electronic image correlation.

It is a further object to provide such a device featuring image scale selection, as well as orthophotography and electronic dodging of photography.

It is another object to provide such a device in which a graphical display of contour tangents may be obtained.

Further objects and advantages will be apparent in the details of construction and combinations thereof by reference to the following specification and accompanying drawings.

BRIEF DESCRIPTION OF DRAWINGS

FIG. 5 is a schematic view of the Von Orel type linkage mechanism used in a basic module, FIG. 6 is an exploded perspective view showing the principal component parts of one successful form of said linkage mechanism, FIG. 7 is a plan showing one successful form of mechanism for the stages used in the basic Module III, FIG. 8 is a side elevation partly in section and broken away of the elements shown in FIG. 7, FIG. 9 is a plan view of a sub-assembly, partly broken away which apply certain correctional movements to said stages, FIG. 9a is a side elevation of the mechanism shown in FIG. 9, FIG. 12 is a perspective view of the stereo optical systems used in said metric evaluation, FIG. 13 is a diagrammetric illustration of an operating component of said optical systems shown in one operating position, FIGS. 14 and 15 are views similar to FIG. 13 showing said component in other operating positions, FIG. 16 is a sectional view taken substantially on the line 16—16 of FIG. 7, FIG. 17 is a sectional view taken substantially on line 17—17 of FIG. 8.

THE GENERAL CONCEPT

Figure 2:
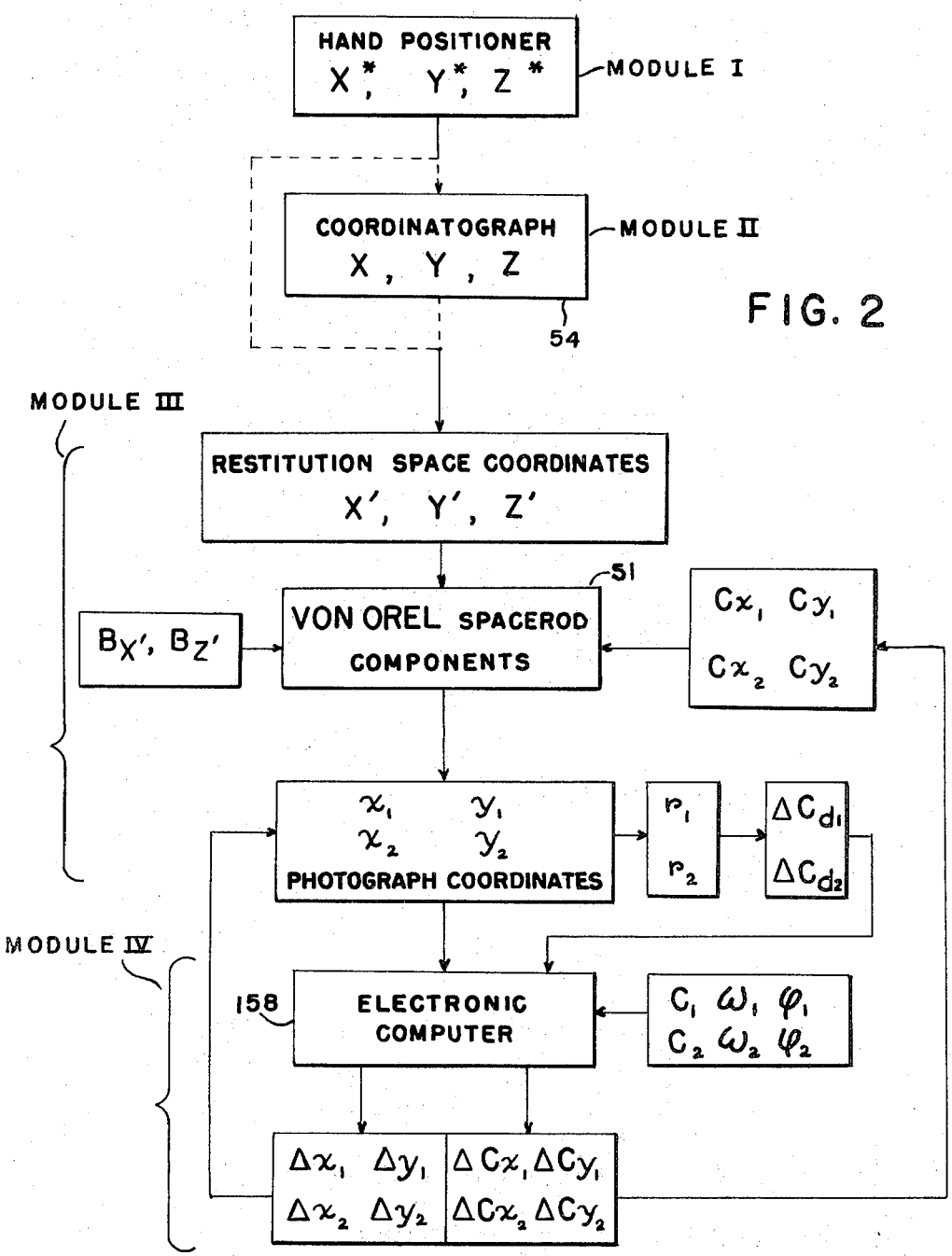
FIG. 2 is a block sequence diagram showing successive steps in the novel method and apparatus for the metric evaluation of stereoscopic photographs.

The novel concept comprises two basic modules and other cooperative functional modules and these modules or groups are designated for instance by the Roman numerals I, II, III and IV in FIG. 2 of the drawings.

Figure 1:
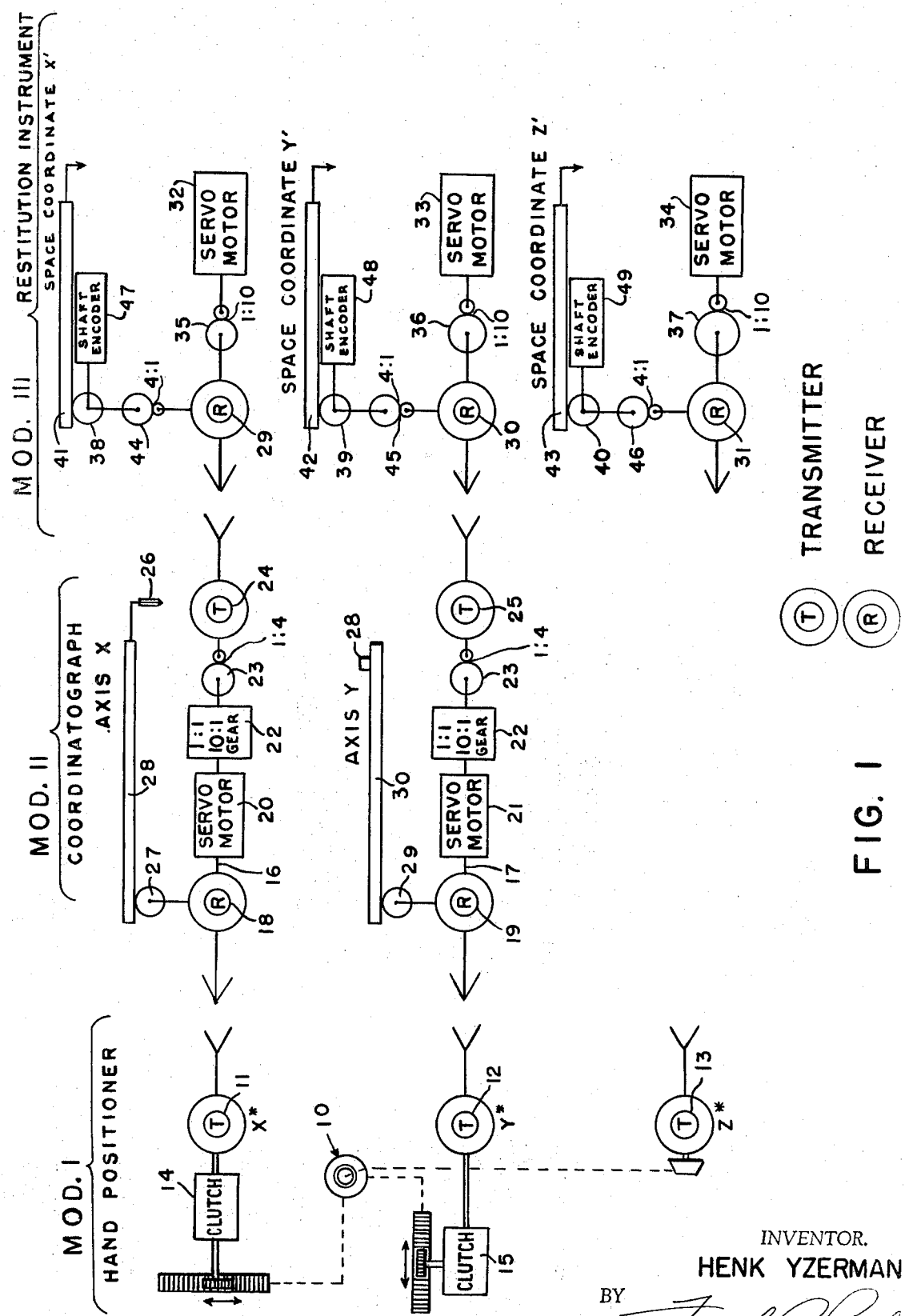
FIG. 1 is a schematic view showing the basic modules of the present invention and the interconnecting elements thereof.

The aforementioned stereo-photogrammetric system by the cooperative action of the basic modules I and III is useful in several varied photogrammetric applications either singly or in selected combinations with other of said functional modules such as;

a. a stereo-comparator or two monocomparators when incorporating binocular vision of either photograph, b. a stereo-restitution instrument for perpendicular photographs, c. a stereo-restitution instrument for photography within 5 grads from perpendicular, d. a stereo-restitution instrument incorporating a co-ordinatograph as designated by Module II in FIGS. 1 and 2, e. a stereo-restitution instrument for affine models, f. a stereo-restitution instrument incorporating an automatically controlled zoom system for orthophotography, g. a stereo-restitution instrument incorporating a module for photographing dodging, h. a stereo-restitution instrument incorporating a module for image correlation, i. a stereo-restitution instrument incorporating a module for incremental contour tangent recording.

It is important that the following conditions be fulfilled in the design of said modular stereo-photogrammetric instrument system.

1. A practically exact solution for the metric evaluation of stereoscopic photographs using so-called conventional elements for the orientation of near perpendicular photography. The significant quantities involved are designated $B_{X'}$, $B_{Z'}$, $\omega_1$, $\omega_2$, $\phi_1$, $\phi_2$, $_1$, and $_2$ and are defined herebelow.

2. Orthogonal observation of the photographs with formats up to 9 × 9 inches, augmented, if desired, by a zoom optical observation system having a zoom range factor of about 7 for excellent stereoscopic identification, measurement and scanning.

3. Independent principal distances for the $x$ and $y$ directions of each of the stereo-photographs from 70 to 320 mm.

4. Versatile correction for atmospheric and lens distortion and for earth curvature compensation.

5. Independent elimination of the $y$ parallaxes of $\omega_1$, $\phi_1$, $\omega_2$, $\phi_2$ and $B_{z'}$ these quantities being defined herebelow as aforesaid.

The geometrical solution was analyzed keeping in mind that a stereo-restitution instrument can be considered as a combination of two rectifiers, one for each photograph, and a spatial intersection computer. The conditions of using near perpendicular photographs and orthogonal observation imply that it is not necessary to rectify the photographs optically prior to viewing.

As described hereinafter, an electro-mechanical rectifier was developed for each of the stereo-photographs for a mechanical reconstruction of the projected rays on the XZ and YZ planes. It is necessary that the instrument be capable of plotting from super wide-angle photographs where the minimum angle of intersection of the bundles of image rays with the image planes may be as small as 25°. Hence the instrument herebelow described necessarily should include a new design principle to avoid any undesirable high friction at the points of transmission of movements, particularly if said movements occur in inclined planes. Therefore the photographs and the observation optics in the present invention were arranged to move on air bearings and in horizontal planes as found in stereo-comparators.

Figure 3:
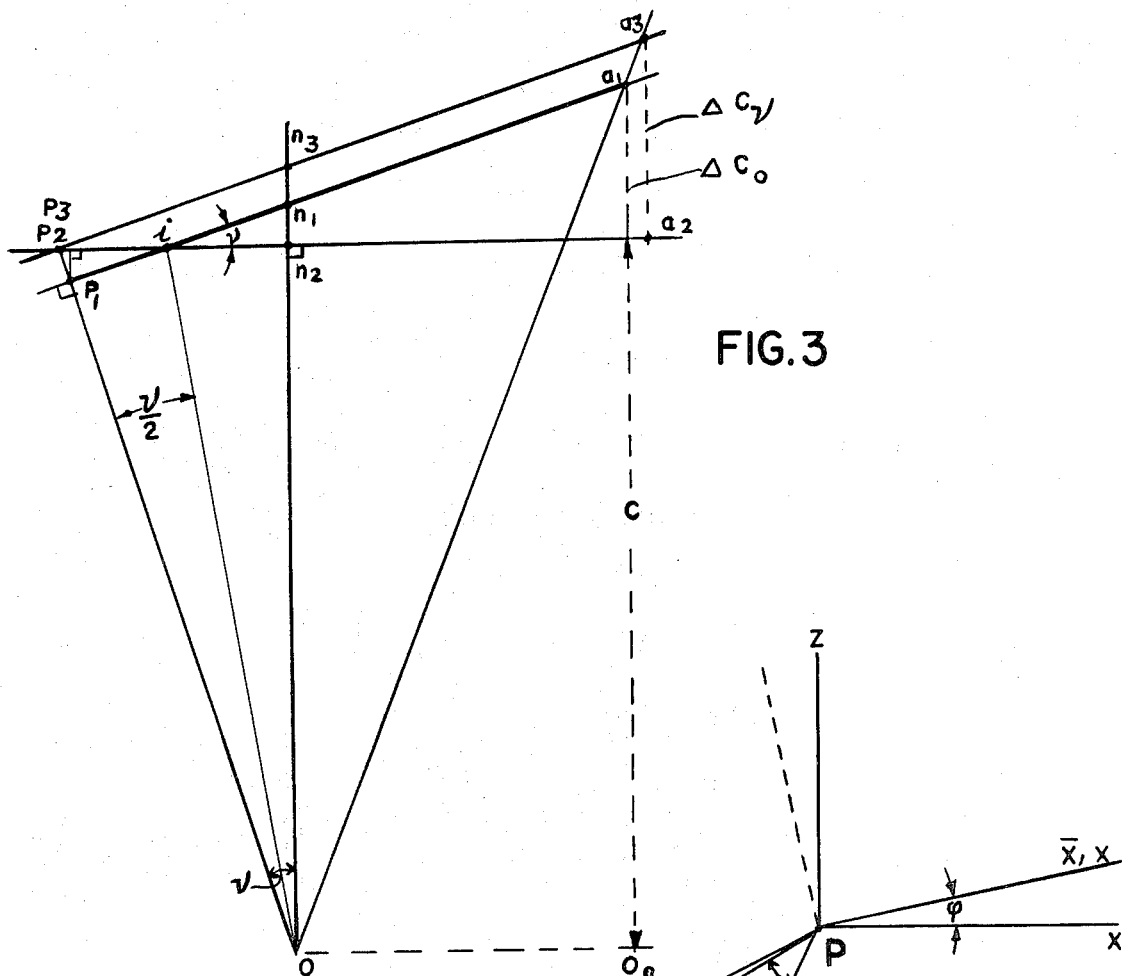
FIG. 3 is a mathematical diagram which illustrates certain geometrical features of tilted photographs.

FIG. 3 of the drawings depicts the geometry in the vertical plane containing the projection center O and the principal point $p_1$, of one photograph having a nadir angle $\nu$. In this figure the designations $p_1$, $n_1$, $a_1$, are points in the tilted photograph while the designations $p_3$, $n_3$, and $a_3$ are the projections of these points from point O onto an auxiliary line parallel to the tilted photograph such that $p_3$ is at a vertical distance of C above O. $p_2$, $a_2$ is the photograph placed horizontally and decentrated by C tan $\nu$. Thus it follows that $$p_2 a_2 \cdot \tan \nu = \Delta C_\nu$$

wherein $\Delta C_\nu$ represents the variation of the principal distance necessary to observe points $a_2$ of the photograph when the space rod is inclined so as to aim at point $a_1$ in the tilted photograph.

Again with reference to FIG. 3, for scanning the photograph perpendicularly in the direction of zero tilt, the required lever arm is $Oa\, a_1 = C + \Delta C_o$. Therefore, a variation of the principal distance $\Delta C_o = i a_1 \sin \nu$ is necessary. Assuming $d$ to be the distance from $p_2$ to $a_2$, then $\Delta C_\nu = d \cdot \tan \nu$ $\Delta C_o = d \cdot \sin \nu$-$C \cdot \tan \nu/2 \cdot \sin \nu$.

The tilt relative to a vertical axis of the photograph can be resolved into components $\omega$ and $\phi$ around X and Y directional axes respectively.

Figure 4:
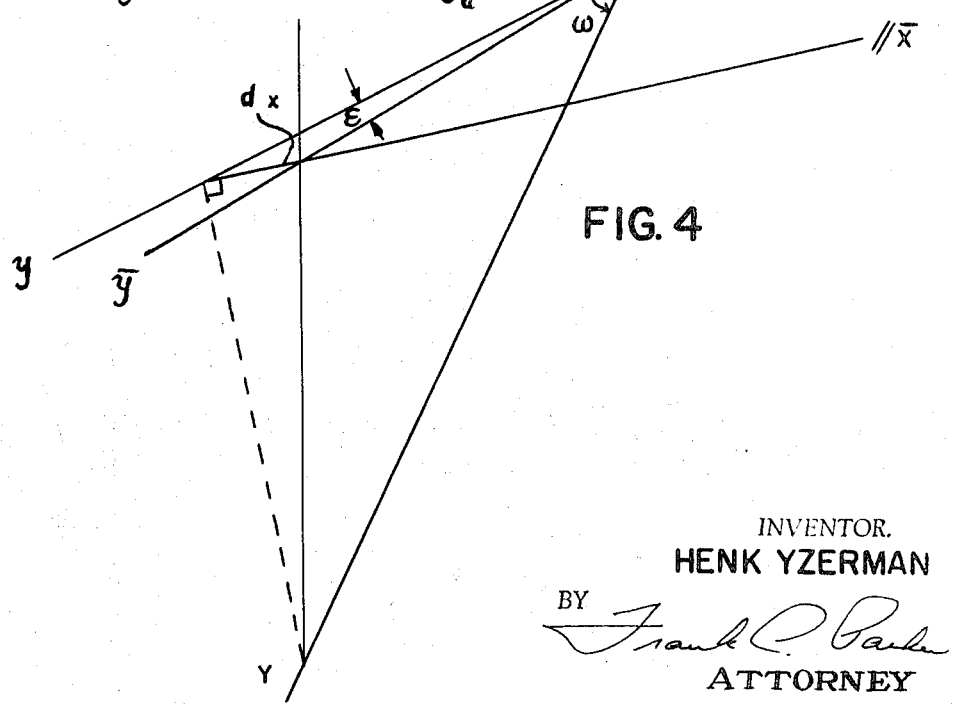
FIG. 4 is another mathematical diagram which illustrates other geometrical features of a tilted photograph.

Referring to FIG. 4, and assuming that the $\bar{x}$ and $\bar{y}$ axes are the intersections of the photograph with XZ and YZ planes respectively (this being accomplished by means of the $_1$ and $_2$ rotations), $\Delta C_{\bar{x}} = \bar{x} \cdot \tan \phi + \bar{y} \cdot \sin \omega - C \cdot \tan \omega/2 \cdot \sin \omega$ $\Delta C_{\bar{y}} = \bar{y} \cdot \tan \omega + \bar{x} \cdot \sin \phi - C \cdot \tan \phi/2 \cdot \sin \phi$ However, $x$ and $y$ are the rectangular photo-coordinates to be taken into account as shown in FIG. 4. If it is assumed that $\bar{x}$ coincides with the $x$ axes of the photographs in the plotter, the $\bar{y}$ axis will then depart from the $y$ axis at a rate stated in the expression herebelow.

$$d_x = y \cdot \sin \omega \cdot \sin \phi$$

The coordinate $x$ in FIG. 4 should therefore be made to vary as a function of $\bar{y}$, $\omega$ and $\phi$. With such conditions prevailing, a geometrically exact solution is provided.

It will be observed that whenever the photographs do not depart from the perpendicular by more than small values, for example, less than 5 grads, then tangent values may be substituted for sin values in the above equations.

The photographs are placed horizontally in the plotter and rotated through the angles $\kappa_1$ and $\kappa_2$, respectively for alignment. As shown in FIG. 3, each photograph must be decentered from $p_2$ to $n_2$. The amount of decentration may be stated as $C \cdot \tan \nu$ in the direction of the nadir point $n_2$, which can be resolved into $\Delta y = C \cdot \tan \omega$ in the $y$ direction, $\Delta x = C \cdot \tan \phi$ in the $x$ direction.

With reference to above mentioned symbols, the definitions with reference to aerial photographs are as follows:

$B_{x'}$ represents the setting of the effective horizontal distance in the $X'$ direction between the exposure stations of the photographs.

$B_{z'}$ represents the effective setting of the vertical distance between the two exposure stations of the photographs.

C represents the principal distance of the taking photogrammetric camera which can be resolved into two components $C_x$ and $C_y$.

$C_x$ represents the effective lever arm of the principal distance C in the $x$ direction of the photograph.

$C_y$ represents the effective lever arm of the principal distance C in the $y$ direction of the photograph.

$\omega_1$ represents the tilt of photograph No. 1 away from the vertical.

$\omega_2$ represents the tilt of photograph No. 2 away from the vertical.

$\phi_1$ represents the tip of photograph No. 1 away from the vertical.

$\phi_2$ represents the tip of photograph No. 2 away from the vertical.

₁ represents the rotational displacement for photograph No. 1.

₂ represents the rotational displacement for photograph No. 2.

X, Y and Z Notation

For purposes of this specification X, Y and Z designate a rectangular coordinate system wherein Z applies to the direction more or less aligned with the axis of the taking camera, i.e. the vertical direction in aerial photography, X is the direction more or less aligned with the photogrammetric base, and Y is the direction mutually perpendicular to X and Z.

In describing the photogrammetric method and apparatus herein, it is convenient to employ different superscripts and forms when discussing such directions in different operations or modules thereof.

Accordingly, capital X, Y or Z without superscript, refer to the coordinates either very generally, or as they appear in graphical display, for instance on the coordinatograph, Module II. Only two of these will appear at any single time in a two-dimensional display.

Capital X*, Y* or Z* with asterisk superscript, refer to movements of the hand positioner, Module I, to produce corresponding motions in the other modules.

Capital X', Y' or Z' with prime superscripts, refer to space model coordinates generated in the restitution instrument, Module III, on the model side of the space rod components thereof.

It will be appreciated that the intersections $\bar{x}$ and $\bar{y}$ of the unrectified aerial photograph, respectively, with the vertical $X'Z'$ and $Y'Z'$ planes, are not perpendicular. Nevertheless, in scanning the photographs, perpendicular motions are made and sensed in relation to the plane of the photograph. These motions are designated small case $x$ and $y$, and are used as inputs to the computer.

DESCRIPTION OF PREFERRED FORM OF INVENTION

ELECTRONIC CONTROL FOR STEREO-PHOTOGRAMMETRIC SYSTEM

Logically the aforesaid control can be divided into two categories which are; the space coordinate drives and readouts shown in Modules I, II and III of the drawings, and secondly the electronic computer with its drive, shown in Module IV.

MODULE I (HAND POSITIONER)

The hand positioner Module I is provided with a manually movable member 10 which causes orthogonal motions in coordinate directions designated X*, and Y* and a rotational motion for coordinate Z* which are subsequently converted into X*, Y* and Z* synchro-transmitter rotations, the transmitter (T) being numbered respectively 11, 12 and 13 in FIG. 1 of the drawings.

The synchro-transmitters 11, 12 and 13 designated T form parts of separable connections and are operably coupled on one side to the manually operated member 10 through electromagnetic clutches 14 and 15 enabling the operator to reposition the member 10 without rotating the synchro-transmitter shafts by actuation of a push button or otherwise, not shown, thus deenergizing the clutches. In effect, the corresponding synchro-transmitters T supply synchronizing signals to the subsequent drive axes 16 and 17 of the coordinatograph Module II and if desired for some purposes the Module I may be connected directly to the stereo-photogrammetric restitution instrument, Module III.

MODULE II (COORDINATOGRAPH)

The coordinatograph comprises two synchro-receiver servo-motor assemblies which drive the aforementioned X and Y axes 16 and 17 respectively, and simultaneously graphically perform a mapping function.

The synchro-receivers 18 and 19 designated R serve the X and Y axes drives respectively, these receivers being complementary to the transmitter parts T which together form the aforesaid separable connections. Said synchro-receivers 18 and 19 sense any relative rotation of their synchro-transmitter T counterparts of the hand positioner Module I and supply an error signal to a feedback control circuit, not shown. This in turn drives respective servo-motors 20 and 21 for repositioning the respective synchro-receivers 18 and 19 to an angle corresponding to the transmitter angle, thus rendering the error signal and servo-motor rotation zero. Rotational motions so induced cause the coordinatograph X and Y axes 16 and 17 to follow the hand positioner commands in Module I.

A set of progressively variable change gears 22 having incremental drive ratios from 1:1 to 10:1 along with a set of 1:4 resolution coversion gears 23 serve to couple a second pair of transmitters 24 and 25 designated T to the drive shafts 16 and 17 respectively, said transmitters forming part of the aforementioned separable couplings between Modules II and III. The transmitters 24 and 25 provide synchronizing signals to the restitution instrument drives through said second pair of separable connections to cause motion along X' and Y' axes in the restitution instrument drives of Module II as described hereinafter.

In order to produce the aforesaid graphical display on a mapping surface, a marking stylus such as a pen 26 is provided as schematically shown in Module II, said pen being guided by suitable mechanism (not shown) for orthogonal planar movements along the X and Y axes. For the X axis, the pen is driven by servo motor 20 which is controlled through the synchro-receiver 18, by means of the pinion 27 and rack 28 connection. Likewise pen 26 is driven along the Y axis by servo motor 21 which is controlled through the synchro-receiver 19, by means of the pinion 29 and rack 30 connection whereby the pen is moved simultaneously along both the X and Y axes.

As mentioned heretofore the coordinatograph drive assemblies for the X and Y axes are modular in nature and may be connected to the X*, Y* or Z* transmitters of Module I in any desired combination. Also the two outputs of transmitters 24 and 25 of the coordinatograph may be connected to any combination of X', Y' or Z' restitution instrument drives in Module III. The third or Z' axis drive of the space coordinate drives in Module III is normally connected directly to the Z* transmitter 13 of the hand positioner in Module I.

To obtain positional readout of any of the drive trains, a digital shaft encoder may be connected to an acting member of the trains such as the rack and pinion drives of either Module II or III.

MODULE III

Module III is a restitution instrument for the space coordinates X', Y' and Z' and is analogous in principle to the instrument described in the above mentioned U.S. Pat. No. 1,477,082. An important difference is that the space rod components, FIG. 5, Nos. 63, 64, 91 and 92 are not angularly deflectible, respectively, in the points 65, 66, 93 and 94 for introducing decentrations. It may be seen that the screws 71, 72, 98 and 98' avoid the need for such angular deflections for making the necessary $\Delta x$ and $\Delta y$ decentrations.

Each of said drives for the X', Y' and Z' space coordinates are identical and consist of a synchro-receiver designated R, the receivers for space coordinates X', Y' and Z' being numbered 29, 30 and 31 respectively in FIG. 1. Constructed similarly to the first mentioned separable connections between Modules I and II, the separable connections between Modules II and III enable the transmitters 24 and 25 to rotate the receivers 29 and 30 respectively. For Z' drive, the receiver 31 may be connected directly to the hand positioner transmitter 13.

The X', Y' and Z' axes drives comprise the synchro-receivers 29, 30 and 31 respectively and servo-motors 32, 33 and 34 to which they are coupled by means of reduction gears 35, 36 and 37 respectively having suitable drive ratios.

Similarly to the functioning of the first said separable connections between the Modules I and II, the X', Y' and Z' axes drives includes sensing and correcting elements, not shown, whereby any angular motion of the particular synchro-transmitter T of either the hand positioner (Module I) or coordinatograph (Module II) is detected and synchronized. The respective synchro-receiver servo-motor assembly drives for X', Y' and Z' axes actuate the respective pinions 38, 39 and 40 and their meshed racks 41, 42 and 43 through 4:1 step-down gearing, numbered respectively 44, 45 and 46, and known as resolution conversion gears.

Digital shaft encoders numbered 47, 48 and 49 for the X', Y' and Z' axes drives respectively, are connected directly to their respective drive pinions 38, 39 and 40 to obtain a position readout.

MODULE IV

ELECTRONIC RECTIFICATION COMPUTER MODULE AND ELECTRICAL DRIVES FOR MECHANICAL LINKAGE COMPONENTS

An electronic computer module is provided as shown schematically in FIG. 2 by a block 158, said figure showing the functions and location of said component in the entire stereo-photogrammetric system.

For the purpose of producing a fully recitified mathematical evaluation from the two stereoscopic photographs an electronic analog computer 158 is provided which not only computes the corrective value but also provides an electrical control for the various drives which translate said values into corresponding motion of the linkage mechanisms to introduce $\Delta x$, $\Delta y$ and $\Delta C$ corrections, as shown in FIG. 5.

The analog computer 158 provides said values by solving a series of four algebraic formulas set forth herebelow which yield, with respect to the first photograph, values for $\Delta x_1$, $\Delta y_1$, $\Delta C_{x_1}$, and $\Delta C_{y_1}$, wherein the formula for $\Delta x_1$ includes the correction $d_x$. Assuming the photographs to be near-parallel, the angular functions are approximated by tangents:

$\Delta x_1 = (y_1 \cdot \omega_1 + C_1) \phi_1$
$\Delta y_1 = C_1 \cdot \omega_1$
$\Delta C_{x_1} = x_1 \cdot \phi_1 + y_1 \cdot \omega_1 - \frac{1}{2} \Delta y_1 \cdot \omega_1 + \Delta C_{d_1}$
$\Delta C_{y_1} = x_1 \cdot \phi_1 + y_1 \cdot \omega_1 - \frac{1}{2} \Delta x_1 \cdot \omega_1 + \Delta C_{d_1}$ The above formulas apply for conventional aerial photogrammetry, however any systematic distortions can be eliminated by suitably altering the formulas, and consequently, the corresponding decentrations $\Delta x$ and $\Delta y$ and corrections to the principal distance components $C_x$ and $C_y$. The meanings of the symbols used in the above formulas are given herebelow unless explained elsewhere.

$\Delta C_{d_1}$ represents the corrections to $C_{x_1}$ and $C_{y_1}$ required to compensate for the radial distortion of photograph 1.

$\Delta x_1$ represents the corrective dencentration in the $x_1$ direction of photograph 1.

$\Delta y_1$ represents the corrective dencentration in the $y_1$ direction of photograph 1.

$\Delta C_{x_1}$ represents the corrective movement in the $C_{x_1}$ direction of photograph 1.

$\Delta C_{y_1}$ represents the corrective movement in the $C_{y_1}$ direction of photograph 1.

THE RESTITUTION LINKAGE MECHANISM

Comprised in the aforesaid Module III is a linkage mechanism which is generally shown schematically at 51 in FIG. 5 of the drawings, said mechanism being actually produced in the form of a mechanical analog device.

Stereo-restitution of perpendicular pairs of stereoscopic photographs 52 and 53 is effected by a spatial intersection computer 51, FIGS. 2 and 5 which can be graphically displayed on a coordinatograph 54 shown also in FIG. 2.

The linkage mechanism is shown schematically in FIG. 5 and it comprises a pair of stages 55 and 56 whereon said pair of photographs 52 and 53 are individually held. Stages 55 and 56 are slidably mounted for motion indicated by arrows $x_1$ and $x_2$ on the stationary mounting bar 57 by mounting lugs 59, 60 and 61, 62 respectively which are slidably fitted on said bar.

The mechanical connection by which the stages 55 and 56 are moved comprises the levers 63 and 64 which are pivoted at 65 and 66 respectively. Said connection further comprises the upstanding rods or posts 67 and 68 which are anchored at one end in the mounting lugs 59 and 61 respectively. On the rods 67 and 68 are slidably fitted the headers 69 and 70 and mounted laterally therein rotatably are the decentration screws 71 and 72 known respectively as the $\Delta x_1$ and $\Delta x_2$ screws.

Threaded on the decentration screws 71 and 72 respectively are the sleeves 73 and 74 whereon are laterally formed the bosses 75 and 76 respectively. Through the bosses 75 and 76 are formed threaded openings at 90° to the decentration screws 71 and 72 and through the openings are threaded the principal distance screws 77 and 78 known as the $C_{x_1}$ and $C_{x_2}$ screws respectively.

Pivotally mounted on the sleeves 73 and 74 at pivot points 79 and 80 respectively are a pair of sleeves 81 and 82 which are slidably fitted onto the short arms of the levers 63 and 64 respectively as shown in FIG. 5.

It will be noted that the decentration screws 71, 72 and the principal distance screws 77 and 78 are used together respectively to correct the photo coordinates $x_1$ and $x_2$.

A pair of optical stages 83 and 84 are provided whereon the movable parts 269 and 270 of the optical systems as shown in FIG. 12 are held. Said stages 83 and 84 as shown in FIG. 5 are supported on mounting bars 85 and 86 which are slidably held in spaced brackets 87, 88, and 89, 90 respectively. The mounting bars 85 and 86 extend in a direction normal to the direction of mounting bar 57 so that the principal motions of the optical stages 83 and 84 are in the direction of the arrows $y_1$ and $y_2$. The combination of stage motions in $x$ and $y$ directions serves to provide an effective mounting for the optical system for viewing any part of the photographs 52 and 53 by the observer.

For moving the optical stages 83 and 84 in the $y_1$ and $y_2$ directions, a pair of bell-crank levers 91 and 92 which are pivoted at 93 and 94 are mounted to swing in a plane parallel to the plane of action of the levers 63 and 64.

The mounting bars 85 and 86 for effecting the $y_1$ and $y_2$ movements as shown in FIG. 5 are actuated similarly to the above described mechanical connections which serve the stages 55 and 56. Therefore it is not necessary that these movements be described in detail. In the mechanical connections 95 and 96, the principal distance screws and the decentration screws are identified as 97, 97' and 98, 98' respectively, the drive motions for said connections being applied at the drive points 95' and 96'.

The long arms of levers 63 and 64 are moved laterally along a supporting frame generally indicated by numeral 99, the frame being called a Z' motion frame. Unison motion of the levers 63 and 64 is secured by a tie bar 99a which is attached at one end thereof by means of a swivel connection 99b to lever 63 and by means of another similar swivel connection 99c to lever 64, the swivel connections being mounted on sleeves 99d and 99e respectively which are slidably fitted onto the frame 99 and are fixed to the ends of the tie bar 99a.

For setting the effective horizontal distance $B_{x'}$, in the X' direction, between the exposure stations of the stereo-photographs 52 and 53, an adjustment link 100 is provided in the tie bar 99a.

The coordinates representing the above mentioned principal distances for the photo stages 55 and 56 are designated $C_{x_1}$ and $C_{x_2}$ and are represented by dotted lines in FIG. 5. The corresponding coordinates for the movement of the optical stages 83 and 84 are designated $C_{y_1}$ and $C_{y_2}$ and are similarly represented by dotted lines.

Designations $\Delta x_1$ and $\Delta x_2$ are applied to the aforesaid decentrations of the photo stages 55 and 56 in the $x$ direction and designations $\Delta y_1$ and $\Delta y_2$ are applied respectively to the decentrations of the optical stages 83 and 84 in the $y$ direction.

The long arms of the bell-cranks 91 and 92 are slidably fitted into another pair of swivel connections which are generally indicated by numerals 101 and 102. Swivel connections 101 and 102 are pivotal at the drive points 103 and 104 respectively and said connections have elongated sleeves 105 and 106 which are slidably fitted onto the frame 99 and which are connected together by a rigid link 107 for simultaneous identical motions in the Y' direction.

It would be feasible to make sleeve 105 adjustable in the same way as adjustment link 100 provides adjustment of tie bar 99a. This adjustment would serve to set the effective horizontal distance $B_{Y'}$, in the Y' direction, between the exposure stations of the stereo-photographs 52 and 53.

With reference to FIG. 5 a displacement in the Z' direction is provided on the two ends of the frame 99, called $B_{Z'}$, for the purpose of setting the effective vertical distance between the exposure stations of the stereo-photographs 52 and 53.

Adjustments to the length of the lever arms 63, 64, 91 and 92 may be made to correspond to different projection distances by moving the frame 99 in the direction indicated by the double arrow Z'. Such a motion of frame 99 is guided by a pair of fixed parallel support struts 108 and 109 on which the frame is slidably journaled as shown in FIG. 5. Any suitable power means, not shown may be provided for moving the Z' frame 99.

As mentioned heretofore, decentration $\Delta x_1$, $\Delta x_2$, $\Delta y_1$, and $\Delta y_2$ of small magnitude are made normal to the principal distances $C_{x_1}$, $C_{x_2}$, $C_{y_1}$ and $C_{y_2}$ to obtain the total movement of the photograph stages 55 and 56 as well as the optical stages 83 and 84.

Figure 10:
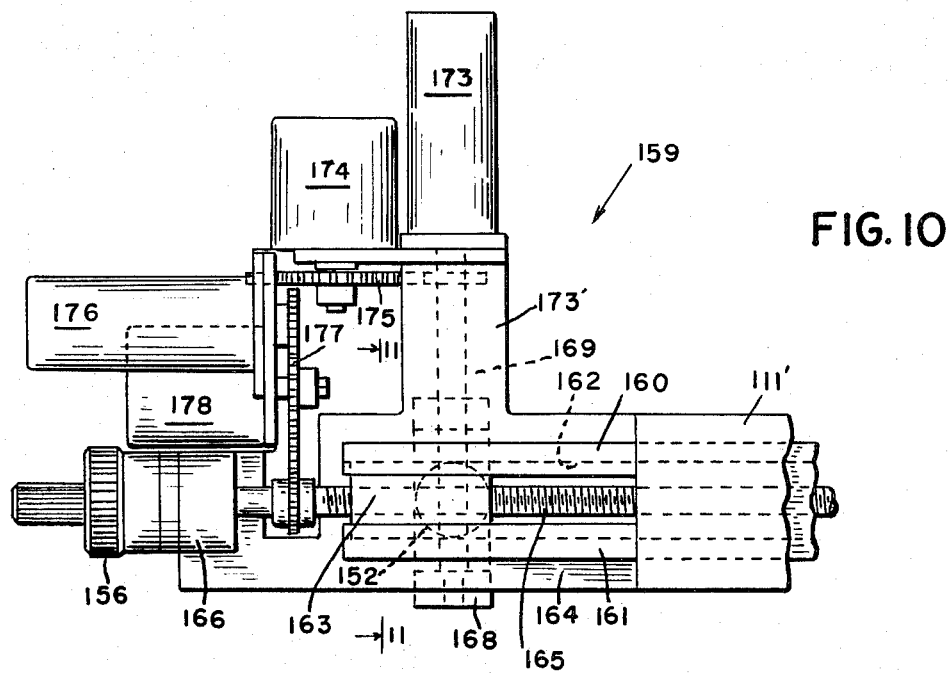
FIG. 10 is a plan view of sub-assemblies for applying minor corrective movements to said stages.
Figure 11:
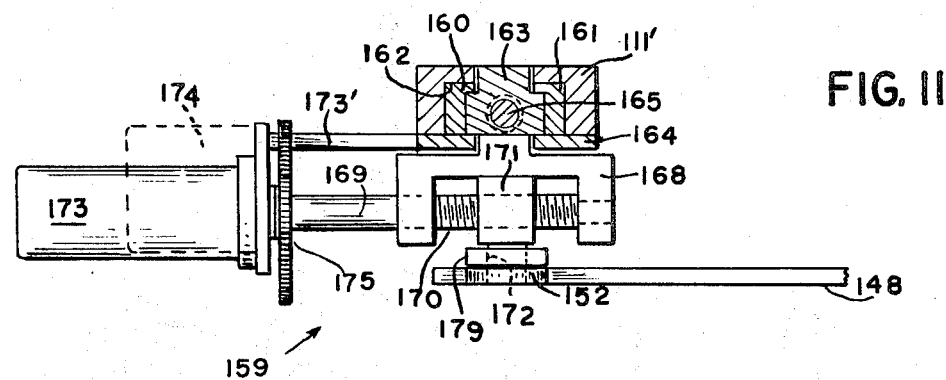
FIG. 11 is a side elevation partly in section of said mechanism shown in FIG. 10.

The $\Delta x_1$, $\Delta x_2$, $\Delta y_1$ and $\Delta y_2$ movements are actuated by the electric motor components 159 to be described hereinafter and which are shown in FIGS. 6, 10 and 11, the movements being applied to the aforesaid drive points or centers 79, 80, 95' and 96' shown in FIG. 5. The motor components 159 are actuated by electric signals received from an electric computer 158 in Module IV as described hereinafter.

It may now be seen that when the stereoscopic photographs 52 and 52 are viewed stereoscopically by means of the optics carried by stages 83 and 84, the operator sees the two pictures as a single image having three dimensions. When all y parallaxes are removed by correct positioning of the photographic and optical stages, and the measuring marks, to be subsequently discussed, appear to fuse and to be positioned on the surface of the apparent three dimensional image, then this condition constitutes a restitution of the photographs. This is to say that, as respects the particular image point being viewed, which correspond to a point on the object, the space rod components are in positions corresponding to the image rays associated with that object point connecting it to those image points, respectively, in each photograph; the principal distance screws are adjusted to the appropriate lengths respectively for each $x$ and $y$ direction; and the photographs are correctly decentered.

Upon scanning, or moving the optics relative to the photographs, or vice-versa, as by moving the hand positioner with clutches engaged, care must be taken by the operator so to move the hand positioner as to keep the measuring marks fused and in apparent surface contact. The resulting actuation of the coordinatograph module generates signals to drive the space rod component levers in accordance with the motions imparted by the operator to the hand positioner. It will be readily seen that the positions of swivel connections 99b, 99c and 101, 102 respectively, are direct functions of $X'$ and $Y'$ spatial model coordinates, notwithstanding that, because these swivel connections are colinear along the $Z'$ frame 99, there is no actual spatial model. The $Z'$ direction spatial model coordinate, it may be further seen, is a direct function of the position of the $Z'$ frame 99 which is movable along the support struts 108, 109.

Meanwhile, the other ends of the space rod components 63, 64, 91 and 92 are positioned in an indirect functional relationship to the photographs, the indirect function being realized when suitable rotations are applied to the respective principal distance and decentration screws to compensate for tips, tilts and other distortions in the photographs. Th determination of the various suitable rotations for the screws is made in a computer, utilizing the photographic coordinates of the points being viewed, the nominal principal distances of each photograph, the tip and tilt of each photograph, and the correction for radial distortions, as inputs to the computer for solving the equations discussed above. As the computer produces the corrective values, proportional signals are transmitted to servo motors for applying the corrective rotations to the screws, thereby continuing the restituted condition of the photographs.

PREFERRED FORM OF RESTITUTION INSTRUMENT

One successful and novel form of mechanical restitution instrument is generally designated by the numeral 110 in FIGS. 6 and 7 of the drawing. As mentioned heretofore, said instrument restitutes the space coordinates $X'$, $Y'$ and $Z'$ and is in effect a mechanical analog device.

A distinctive feature of the instrument is the compact and multidecked construction which provides a very low profile as best seen in FIG. 6 comprised in said instrument is a pair of optics-carrying stages 111 and 112 known as $y$ stages bearing the movable part of the optical systems and arranged in the upper deck or layer, of the optical systems which are diagrammatically shown in FIGS. 6 and 12. In the next lower deck or layer are arranged two photograph stages or carriages 113 and 114 known respectively as $x_1$ and $x_2$ stages whereon the photographs 52 and 53 respectively are held. The bottom deck or layer comprises the so-called $Z'$ stage wherein the projection distances of the photographs in the $Z'$ direction are introduced, as described hereinafter.

As best shown in FIGS. 6 and 7 of the drawings, the $y_1$ and $y_2$ stage 111 and 112 are supported along one side on a single central rod 115 by means of interpositioned bearing bosses 116, 117, and 118, 119 respectively whereby compactness and good relative alignment are enhanced. The opposite sides of stages 111 and 112 are supported on individual preferably flat auxiliary bars or rods 120 and 121 extending parallel to the central mounting rod 115 and anchored at one end on suitable posts 122 and 123, and anchored at the other end on a stationary plate 124. Formed on stages 111 and 112 along said opposite sides are singular bearing members 125 and 126 respectively which slide on the bars 120 and 121.

The $x_1$ and $x_2$ stages 113 and 114 are also mounted along one side thereof preferably on a single mounting rod 127 for good alignment, said stages being provided with bearing bosses 128, 129 and 130, 131 having bores which are slidably fitted to the mounting rod. Mounting rod 127 extends orthogonally to mounting bar 115 so that the stages 113, 114 travel in $x_1$ and $x_2$ directions and stages 111, 112 travel in $y_1$ and $y_2$ directions. As best shown in FIG. 6, the opposite sides of the stages 113, 114 are supported on individual preferably flat bars 132 and 133 by means of protruding bearing pieces 134 and 135 formed on the respective stages 113 and 114 so as to ride on the bars.

It is intended that all of the supporting bearings in the bosses 116–119, 125, 126 as well as 128–131 and 134, 135 shall be made substantially frictionless such as by the use of air bearings.

Suitable support posts 136, 137 and 138 are provided for the rod 127, and furthermore the support posts 139, 140 and 141, 142 are provided at the ends of the mounting bars 132 and 133 respectively. The central mounting rod 115 is secured at one end in a post 143 and at the other end in the anchor plate 134.

In order to move the $x_1$ and $x_2$ stages 113 and 114 along the mounting rod 127, levers 144 and 145 respectively are provided, said levers being rotated about fixed pivots 146 and 147 respectively. On the same fixed pivots 146 and 147 are pivoted the bell-crank levers 148 and 149 respectively for the movement of the $y_1$ and $y_2$ stages 111 and 112 respectively. The levers 144, 145 and bell-cranks 148, 149 serve as independent components of the space rods and are shown respectively at 63, 64 and 91, 92 shown in the schematic diagram in FIG. 5.

The aforementioned drive points 79, 80, 95', 96' of FIG. 5 are effectively constituted as shown in FIG. 6 by the roller bearings 150 and 151 which are movably attached as explained herebelow to the $x_1$ and $x_2$ stages 113 and 114 respectively and also by the roller bearings 152 and 153 which are attached to the $y_1$ and $y_2$ stages 111 and 112 respectively.

As set forth hereabove, the restitution of the photo coordinates $x_1$, $y_1$, and $x_2$, $y_2$ are made by movements of the levers 144 and 145 and bell-cranks 148 and 149 using motor means or manually as hereinafter explained, the drive point bearings 150 and 151 being moved in the $x_1$ and $x_2$ directions as indicated by the double-ended arrows and the drive point roller bearings 152 and 153 being moved by said motor means or manually in the $y_1$ and $y_2$ directions. Adjustment knobs 154 and 155 connected by lead screws and slides to the contacting bearings 150 and 151 as shown in FIG. 6 are provided to manually introduce the principal distances for the movements of the $x_1$ and $x_2$ stages 113 and 114. Likewise adjustment knobs 156 and 157 are provided for the same purpose on the $y_1$ and $y_2$ stages 111 and 112, knob 157 being mounted on a stage extension 112' which forms part of the stage 112.

As mentioned hereabove, an electronic computer 158 is provided as shown in FIG. 2 to supply the necessary electrical signals which actuate motorized subassemblies or actuating units 159, said units being shown in FIGS. 10 and 11. Said units 159 are provided to apply the aforesaid decentrations $\Delta x_1, \Delta y_1, \Delta x_2$ and $\Delta y_2$, and corrections $\Delta C_{x_1}, \Delta C_{y_1}, \Delta C_{x_2}, \Delta C_{y_2}$ to the respective principal distance screws as shown in FIGS. 6 and 7, in order to compensate for tip and tilt effects in the photographs 52 and 53.

One typical example of said units 159 is shown in FIG. 6 is constructed as shown in FIGS. 10 and 11. With reference to FIGS. 10 and 11, the bearing translating unit is generally indicated by numeral 159; the roller bearing is numbered 152 in this instance; and the stage extension on which it is mounted is numbered 111'.

Comprised in the bearing translating unit 159 is a set of slideways 160 and 161 which are held in any preferred manner, not shown, within a recess 162 in stage extension member 111' for instance. Engaged within said slideways 160 and 161 is a slider block 163, said block being confined within the slideways by an elongated base plate 164 which is secured to the stage extension 111'.

For moving the slider block 163, an elongated shaft 165, previously referred to as the principal distance screw, is threaded lengthwise therethrough and is rotatably journaled at the inner end in a stationary header not shown.

The shaft 165 is seated at the outer end of base plate 164 in a block 166 wherein it is rotatably held and axially immobilized, the block being fixed in any suitable manner to said plate. A knob 156 is provided on shaft 165 to allow manual operation thereof. Roller bearing 152 is carried by the slider so that rotation of the knob 167 causes motion of the roller in the $C_y$ direction as shown in FIGS. 6 and 7.

Means for obtaining $\Delta y$ motion of the roller bearing 152 as shown in FIGS. 6, 10 and 11 is provided by forming a U-shaped yoke 168 on the under side of slider block 163. A cross shaft 169 is rotatably held in the yoke 168 and on the shaft threads 170 are formed. Threaded onto the cross shaft 169 is a nut 171 which is slidably fitted within the yole 168 and the nut is provided with a stub shaft 172 whereon the roller bearing 152 is held.

For rotating the shaft 169 a reversible synchronous motor 173 is attached thereto and the motor is actuated in response to electrical signals produced in the electronic computer 158 shown in FIG. 2. The motor 173 is fixed in any preferred manner to a rigid bracket 173' which extends from the base plate 164.

Rotation of the shaft 169 is sensed by a potentiometer 174 which is connected to the electric computer 158 so as to control the shaft rotation, the potentiometer being driven by suitable gearing 175 of specified ratio from the shaft 169.

The main shaft 165 is provided with a motor drive in addition to the manually operated knob 156 consisting of a reversible synchronous motor 176 which is a duplicate of motor 173. Shaft 165 is driven by motor 176 through a suitably ratioed gear train 177. A potentiometer 178 is also provided for sensing the rotation of sahft 165, said potentiometer being driven by the gear train 177.

Figure 18:
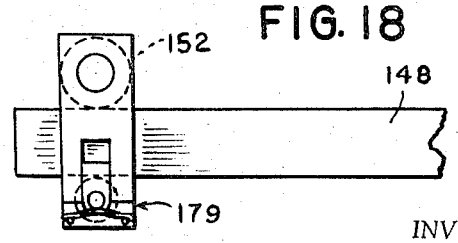
FIG. 18 is a plan view partly borken away showing a tension device used in the invention.

A tensioner device 179 as shown substantially in FIG. 18 is attached to the bell-crank lever 148 to bear against the back side of the roller bearing 152 and maintain it in firm contact with the bell-crank throughout all its movements.

It will be understood that both motors 173 and 176 are under control of the electronic computer 158 and the actuating unit 159 as shown in FIG. 10 is generally utilized at four positions as indicated in FIG. 6 generally at the locations of the knobs 154–157 for automatic movements $\Delta C_{x_1}, \Delta C_{x_2}, \Delta C_{y_1}$ and $\Delta C_{y_2}$ of the $x_1$ and $X_2$ stages 113 and 114 and $y_1$ and $y_2$ stages 111 and 112 as well as to provide additionally for the remote electrical control of decentrations $\Delta x_1, \Delta x_2, \Delta y_1,$ and $\Delta y_2$.

As mentioned hereabove, a Z' stage 99 is provided partially underlying the $x_1$ and $x_2$ stages and located in a predetermined relationship to the photo stages $x_1, x_2$ and optical stages $y_1$ and $y_2$, said stage resting on a support plate 183.

The Z' stage 99 has a three-point supporting system including an elongated central support rod 181 which extends parallel to and beneath the mounting rod 115 and is secured at one end in the fixed post 137 as best shown in FIG. 6. The other end of the mounting rod 181 is fixed to an erect post 182 which is attached to a support plate 183 as shown in FIG. 8.

On the rod 181 is slidably fitted a long tube 184 which forms a bearing for the front end of the Z' stage. Transversely on the rear end of the tube 184 is provided a channel-shaped chassis member 185 whereon the tube 184 is fixed. The opposite ends 196, 197 of said chassis member 185 rests slidably, for instance on air bearings, on the shoes 186 and 187 which are affixed to the support plate 183 as shown in FIGS. 6 and 8. Gusset plates 188 and 189 are suitably fixed, as by welding, to the tube 184 and chassis member 185 to stiffen the Z' stage 99. Suitable clearances are formed between the rear post 182 and the chassis member 185 to allow the Z' stage to move freely in the Z' direction for a suitable distance.

When the restitution linkage mechanism 110 is assembled, the Y' bell-cranks 148, 149 extend across the top surface 190 of the chassis member 185 and therebeyond while the X' levers 144, 145 are hung below the chassis member as shown in FIGS. 7 and 17. The X' and Y' ends of said levers and bell-cranks are moved to adjust the space coordinate X' and Y' and thereby scan the stereo-photographs 52 and 53 as shown in FIGS. 6 and 7 in response to movements of the hand positioner shown at 10 in FIG. 1 as described hereinafter.

Included in the mechanism which moves the Y' bell-cranks 148, 149 is a pair of roller bearings 191, 192 which are held in positive contact with the operating edges of the bell-cranks by any preferred tensioner device 179 such as shown in FIG. 18. A pair of crossheads 193, 194 are provided whereon said roller bearings 191 and 192 are rotatably mounted, said crossheads being slidably fitted onto a mounting rod 195 extending between and anchored in the end blocks 196, 197 which are secured on the chassis member 185.

The crossheads 193 and 194 are connected together to obtain identical movements along the rod 195 by a rigid tie bar 198 attached to said crossheads as shown in FIGS. 6 and 17 whereby the roller bearings 191 and 192 travel along the chassis member 185 together and carry the bell-crank ends laterally simultaneously.

Likewise a second pair of crossheads 199, 200 are provided whereon a second pair of roller bearings 201, 202 are rotatably mounted as shown in FIGS. 6 and 17, said crossheads 199, 200 being slidably fitted on a mounting rod 203 which is secured at its ends in the end blocks 196 and 197 parallel with rod 195. Crossheads 199, 200 are connected together by a two-part tie bar, rather than a rigid one, composed of a rigid link 204 anchored on crosshead 199 and an adjustable rigid link 205 which is anchored on the crosshead 200. Links 204 and 205 overlap each other and are clamped together at the overlap by a suitable clamp screw 206. An elongated open slot 207 is formed along a major portion of the link 205 through which the clamp screw 206 freely extends and a thick block 208 is interposed between the overlapping ends of links 204 and 205.

For the purpose of setting the effective horizontal distance $B_{x'}$ between the exposure stations of the aforementioned stereo-photographs 52 and 53, the separation between the roller bearings 201 and 202 is made adjustable. The $B_{x'}$ setting is provided by a long adjusting screw 209 having a knob 210 thereon. The screw 209 is axially immobilized by suitable mechanism not shown in a lug 211, FIG. 6, formed on the crosshead 200. At the other end, the screw 209 is threaded through the block 208 so that rotation of the screw causes the block carrying the clamp screw 206 to travel along the open slot 207. A linear scale 212 is formed on the link 205 along one side of the elongated slot 207, FIG. 8, to facilitate setting of the $B_{x'}$.

As mentioned heretofore, the setting of the vertical distance $B_{z'}$ between the exposure stations of the stereo-photographs 52 and 53 is individually applied to the roller bearings 192 and 202 by the manually operated knobs 213 and 214 respectively. The knobs 213 and 214 operate similar slide structure, one of which is generally indicated by numeral 215 in FIGS. 6 and 17, whereon the roller bearings 192 and 202 are individually mounted.

THE DRIVE SYSTEM

As shown diagrammatically in Module III of FIG. 1 of the drawings, servo-motors 32, 33 and 34 are used for independently setting the space coordinates $X'$, $Y'$ and $Z'$ which are shown in FIGS. 1 and 6, the servo-motors being connected to operate corresponding gear racks 41, 42 and 43, FIGS. 6 and 8, as described herebelow.

As shown in FIGS. 1, 8, 16 and 17 the $X'$ rack 41 is secured in any preferred manner such as screws to an L-shaped flanged plate member 216 which is fixed onto the crosshead 200 so that the rack, plate member and crosshead all may be moved in unison. The aforementioned slide structure 215 is solidly fixed onto the plate member 216. Likewise as shown in FIG. 17 the $Y'$ rack 42 is secured to a T-shaped plate member 217 which is fixed in any suitable manner onto the crosshead 194 so that the rack, plate member and crosshead all travel together.

Power for moving the racks 41 and 42 is supplied by the servo-motors 32 and 33 respectively which drive the racks through suitable gear reduction assemblies 35 and 36 and shown in FIGS. 1 and 16. The gear reduction assemblies 35 and 36 are mechanically interposed between the respective servo-motors 32 and 33 and a pair of synchronous receivers 29, 30 which are directly geared into the racks 41, 42.

In operation, electrical synchronizing signals received by the synchronous receivers 29, 30 (FIG. 1) from the transmitters 24, 25 or alternatively from transmitters 11, 12 serve to detect any lack of angular synchronism therebetween. Corrective impulses are passed to the servo-motors 32, 33 which rotate the synchronous receivers to follow every angular motion caused by the hand positioner and thereby move the respective racks 41, 42 which in turn move the roller bearings 191, 192 and 201, 202 as shown in FIGS. 6 and 8.

Similarly to the above described apparatus, the so-called $Z'$ motion of the $Z'$ stage or frame 99 is provided by fixing a rack 43 along the tube 184 and gusset plate 189 as shown in FIG. 6. A synchronous receiver 31 is provided having a geared connection 46 to the rack 43 and having a further geared connection 37 to a servo-motor 34.

The operation of the last described apparatus causes the $Z'$ stage or frame 99 to move in the $Z'$ direction.

THE READ-OUT MECHANISM

Since the restitution instrument comprised in Module III is not adapted to produce a graphic record, a read-out device is provided for displaying the values of the $X'$, $Y'$ and $Z'$ coordinates.

For this purpose a pair of shaft encoders 218 and 219 is provided which are mounted on the $Z'$ frame 99 and are connected by appropriate gearing as best shown in FIGS. 16 and 17 to racks 41' and 42' so as to secure operation thereof. Furthermore another rack 220 is fixed along the tube 184 parallel to rack 43 and a shaft encoder 221 is drivingly engaged therewith simularly to the encoders 218 and 219 so that any motion of the $Z'$ frame may be immediately recorded.

The output of the shaft encoders 218, 219 and 221 is connected to a visual display unit 298 as shown in FIG. 7 located conveniently to the operator, said unit being operated for instance by a digital computer system. The aforementioned shaft encoders may also be operatively attached to the drive gears 27 and 29 as shown in Module II of FIG. 1.

MECHANISM FOR COMPENSATING DISTORTION

For the compensation of radial distortions of the photographs, a compensating mechanism is provided which is generally designated by numeral 222 in FIGS. 9 and 9a of the drawings and is referred to as the $\Delta C_d$ adjustment.

Said mechanism 222 comprises a correcting wheel 223 having an axle 224 around which it rotates. On the exposed radial face of the wheel 223 an annular track or surface 225 is formed having undulations 226 which may be adjustable, the shape and degree of departure from a plane surface and the angular spacing of said undulations being proportional to the algebraic sum of the distortions to be compensated in a predetermined manner and known as the $\Delta C_d$ quantity.

A contact member 227 is held in light contact with the undulating surface or track 225 so as to follow the undulation as the wheel 223 is turned and said member is shown in FIG. 9 as a screw whereby contact adjustments may be made. The screw member 227 is held in a lever 228 which is privoted at 229 in a fulcrum member 230 attached to the stage 113. A light spring 231 is provided to bias the contact member 227 into continual light frictional contact with the track 225.

An electronic sensor, as for instance a linear potentiometer 232, is provided in an electrical circuit not shown which is connected to the electronic computer 158 of Module IV whereby the variations of electrical characteristics of the circuit are used to cause signals in the circuits which control the $\Delta C_x$ and $\Delta C_y$ motors 176 (FIG. 10). Any preferred tractive connection 228' may be cooperatively formed on the end of lever 228 and potentiometer shaft 232' to operate the potentiometer as shown in FIGS. 9 and 9a.

In order to rotate the wheel 223 in response to relative motions of the $x$ stage 113 to the $y$ stage 111, a drum 233 is provided on wheel 223 whereon a cord 234 is wound, the cord being passed through a ferrule 235 which is fixed onto a bracket 236. The bracket 236 is fixed to an element 237 of the $x$ stage 113 so as to follow its movements. The other end of the cord 234 is attached to an element of the $y$ stage 111 whereby any relative movement between said stages results in a movement of the cmpensating wheel 223.

A torsion spring 238 wrapped around the drum 233 or an equivalent device is provided to maintain a weak tension on the cord 234.

It will be understood that both of the $x$ stages 113 and 114 are equipped with the $\Delta C_d$ compensating device shown in FIGS. 9 and 9a and the linear potentiometers thereof are connected into their respective control circuits for the motors 176.

It may be observed that a radial photographic distortion compensation mechanism as above described may be employed in any stereoplotter having a variable principal distance setting.

THE OPTICAL SYSTEM

For viewing the so-called floating mark a stereo optical system is provided. The preferred form is shown in FIG. 12 and is composed of two viewing optical systems which are numbered generally 239 and 240, the systems being similar and essentially allochiral in structure.

The two viewing optical systems 239 and 240 are focused at the viewing points 241 and 242 which lie in the plane of the stereo-photographs 52 and 53, and the photographs are movable in the direction of the arrows $x$, the excursion of each photograph being at least as great as the transverse dimension of one photograph. Likewise, the portions of the optical systems 239 and 240 which lie along the transverse axes 243 and 244, i.e. those portions designated 269 and 270, are movable in unison in the direction of the arrows $y$ a distance in excess of the transverse dimension of the photographs.

Comprised in the optical systems 239 and 240 are a pair of objectives 245 and 246 which are focused on the respective photos 52 and 53 and are housed in a pair of lens mountings 247 and 248 which also compactly contain two optically aligned simliar zoom optical systems, not shown, which may be independently variable, operated by handles numbered 249 and 250 respectively. In the rear ends of the lens mountings 247 and 248 are provided a pair of collimating lenses 251 and 252 whereby the image rays 253 and 254 are rendered parallel.

Innermost on the lateral axes 243 and 244 are mounted angularly a pair of plano mirrors 255 and 256 respectively which deviate said parallel rays rearwardly along a pair of longitudinal axis portions 257, form in parallelism to each other. Optically aligned on the lateral axes 243, 244 outwardly of the lens mountings 247, 248 is a pair of beam splitter cubes 259 and 260 which are movable along with the lens mountings. Said beam splitter cubes 259, 260 receive the image rays coming from the points 241 and 242 and direct said rays into said objectives along the axis portions 243, 244. A pair of stationary decollimating lenses 261 and 262 are aligned on the parallel longitudinal axes 257 and 258 to receive the collimated image rays from the mirrors 255, 256 and from respective images therefrom at image planes 263 and 264.

A pair of reticles 265, 266 is mounted on the lateral axes 243 and 244 respectively, the reticles being mounted by suitable means not shown so as to move in unison with the other optical parts such as the beam splitting cubes located on these axes. The reticles 265 and 266 are spaced away from the beam splitting cubes 259 and 260 at the same axial distance as the distance from the points 241 and 242 to said beam splitting cubes so that the images of said reticles are formed at the image planes 263 and 264 and thereby the beam splitters introduce the floating marks into the optical system.

Means for illuminating said reticles is provided such as the lamps 267 and 268 which are located on the lateral axes 243, 244 respectively of said beam splitting cubes adjacent to the reticles.

The portions of the optical systems above described are numbered 269 and 270 and are movable as a unit in the direction $y$ during operation of the instrument by reason of the collimation of the image rays at 253 and 254, the entended positions of the respective optical axes 257 and 258 being indicated by dotted lines 271 and 272 and terminating at the points (241') and (242') respectively.

The images formed at the image planes 263 and 264 are projected rearwardly to a pair of pentaprisms 273 and 274 which deviate the image rays at 90° into the space between the pentaprisms. A pair of flat deviation mirrors 275 and 276 are aligned on the optical axes between the pentaprisms 273 and 274, said mirrors being angularly held to deviate the image rays vertically onto further deviation means 277 which deviates the axis portions 278 and 279 of the optical axes upwardly and rearwardly. Said image rays are brought to a focus by relay lenses 296 and 297 at the second image planes 280, 281 where the stereo images are viewed through a pair of eypieces 282 and 283 focused thereon.

For the purpose of rapidly changing the stereo view of said stereo images from an ortho stereo to a pseudo-stereo view, an optical switch generally indicated by numeral 284 is interposed in the optical system between the pair of eyepieces 282, 283 and the pair of relay lenses 296 and 297.

The optical switch 284 is composed principally of an elongated three-part optical member 285 which is mounted transversely of the pair of axes 278, 279 and is movable in the direction of the double-ended arrow *a* to quickly align one of the three contiguous parts thereof with said axes 278, 279. It will be noted that at the point where optical member 285 is mounted, the axes 278 and 279 cross one another and that said point is equidistant along said axes from the focal planes 280, 281. Uppermost in the optical member 285 is a mirror-bearing cube formed of transparent material such as glass as shown diagrammatically in FIG. 12 having a double-sided diagonal mirror 286 extending therethrough. Surrounding said upper mirror cube when it is aligned with optical axes 278 and 279 is a stationary cluster of plane mirrors 287, 288, 289, 290 which are spaced away from and in proximity to the four sides of the glass cube as shown in FIG. 12. The mirror cluster also includes two other optically aligned deviation mirrors 291 and 292 which together with the other four mirrors of said cluster serve to deviate and direct the optical axes 278 and 279 toward the center of double-sided mirror 286 in the cube and then redirect the emergent image rays toward the eyepieces 282 and 283 as shown additionally in FIGS. 13, 14 and 15.

In the position shown in FIG. 13, the optical path 278 of image rays is shown by heavy lines while the ray path 279 is shown in light lines whereby ortho-stereo vision is provided, i.e., the image of the left stereo-photograph is seen through the left eyepiece and the image of the right stereograph is seen thruogh the right eyepiece.

In the position of the optical member 285 as shown in FIG. 14, the middle glass cube has no diagonal mirror surfaces therein and is brought into optical alignment with the cluster of mirrors so that optical paths or axes 278, 279 travel directly through the cube without interruption whereby pseudo-stereo is provided, i.e., the right eye sees the left stereo-photograph and the left eye sees the right stereo-photograph. One of the two optical axes in FIG. 14 is designated by a heavy line and the other axis by a light line. It may be appreciated that neither the introduction nor the removal of the mirror 286 affects the optical path lengths, these remaining the same in either condition.

The advantage to be gained by the above described optical construction resides in the fact that quick shifts of the optical member 285 in the direction of the arrow *a* from the ortho to the pseudo positions cause the stereo perception of the operator to be more acute in most cases.

In addition, if the switch is activated when the operator has fused the stereo images and sees the floating mark in apparent contact with the photographic model surface, the floating mark will seem to remain in apparent contact during the change from ortho to pseudo if the photographs are correctly positioned. If the photographs are not correctly positioned, the floating mark will appear to jump. Accordingly, the ortho-pseudo switch serves as a check device for positioning of the photographs.

The lowest cube of the shiftable optical member 285 when it is aligned in the optical system appears as shown in FIG. 15. The lowest cube differs from the uppermost cube only in the fact that the mirror is semi-reflective whereby light projected along optical axis 278 is partly transmitted to the operator's left eyepiece 283 as shown by the full lines and is also partly reflected along the dashed lines 294 to the operator's right eyepiece 282.

The advantage of such a structure as shown in FIG. 5 is that when only one of the photographs is illuminated as shown by lamp 295, it may be viewed binocularly when the lamp 293 is not in operation it may be noted that no light rays will follow the optical path 279. When both lamps 293 and 295 are on, both images will be presented to each eye, greatly facilitating the operator's ability to move the photographs 52 and 53 together for coarse stereo orientation. It is also feasible to alternate the two lamps periodically for image comparison purposes.

From the foregoing description, it will be realized that there is here presented a restitution method and apparatus for stereo-photographs which reliably provides a numerical display of data for constructing a model having high accuracy, said apparatus comprising a number of cooperating modules which are compact structures and may be separately serviced.

Although only certain forms of the present invention have been shown and described in detail, other forms are possible and changes may be made in the arrangement and detailed construction thereof and substitutions may be made without departing from the spirit of the invention as defined in the claims herebelow.

I claim:

1. A method for restitution of stereo-photographs, comprising the steps of:
  a. measurably viewing stereoscopically associated points on said stereo-photographs with a stereoscope having movable stages for scanning said stereo-photographs;
  b. scanning stereoscopically associated points in said stereo-photographs by moving said stages with a plurality of undeflectible, orthogonally resolved space rod components, said space rod components functionally relating by their positions at their first ends indirectly to the stereo-photographs, and at their second ends directly to space coordinates;
  c. measuring the coordinates of said stereoscopically associated points in said stereo-photographs;
  d. computing, using the coordinates so measured, corrections to the effective lever arms of said space rod components and decentrations of said stereo-photographs; and
  e. orthogonally and independently introducing said computed corrections and decentrations in respect of each stereo-photograph to realize said indirect functional relation between said first ends of said space rod components and said stereo-photographs, whereby said restitution of said stereo-photographs is accomplished.

2. The method of claim 1 wherein said introduction of said computed corrections and decentrations is made by driving screws through rotations proportional to said corrections and decentrations, respectively, said screws connecting said first ends of said space rod components with said movable stages.

3. The method of claim 2 wherein said computations of said corrections and decentrations are accomplished by connecting electronic computer means to receive said measured coordinates and by programming said electronic computer means with the nominal principal distances of each photograph, the tips and tilts of each photograph and the correction for radial distortions.

4. A method for restitution of a pair of stereo-photographs comprising the steps of:
   a. stereoscopically scanning said photographs with a stereoscope member of a restitution module;
   b. generating first electrical signals by moving a hand positioner module in response to said scanning;
   c. transmitting said first electrical signals fr driving a graphical display module;
   d. generating second electrical signals in said graphical display module;
   e. transmitting said second electrical signals for driving motors drivably connected to space rod components in said restitution module;
   f. driving said space rod components for motion of said stereo-photographs;
   g. measuring positions of points in said stereo-photographs relative to stereoscopic viewing means;
   h. computing corrections to the principal distances for $x$ and $y$ directions for each stereo-photograph, based upon said positions;
   i. computing decentrations in the $x$ and $y$ directions for each stereo-photograph based upon said positions; and
   j. introducing said corrections and decentrations between said space rod components and said stereo-photographs to move said photographs relative to said stereoscope member for correct relative positioning thereof, whereby restitution of said pair of stereo-photographs is accomplished.

5. The method of claim 4 wherein said corrections and decentrations are computed by employing automatic computer means.

6. Apparatus for restitution of stereoscopic photographs, said apparatus comprising:
   a. $x$ stage means;
   b. $y$ stage means;
   c. means for mounting said $x$ stage means for motion in the $x$ direction;
   d. means for mounting said $y$ stage means for motion in the $y$ direction, said $x$ and $y$ directions being orthogonal with respect to each other;
   e. $x$ and $y$ space rod components;
   f. means for connecting said $x$ space rod component to said $x$ stage means, said $x$ stage connecting means including means for moving said $x$ stage means in said $x$ direction;
   g. means for connecting said $y$ space rod component to said $y$ stage means, said $y$ stage connecting means including means for moving said $y$ stage means in said $y$ direction; and
   h. orthogonally resolved $C_x$ and $C_y$ means for correcting the principle distance C for each photograph of said stereoscopic photographs, said $C_x$ means being connected between said $x$ stage means and said $x$ stage connecting means, said $C_y$ means being connected between said $y$ stage means and said $y$ stage connecting means.

7. The apparatus as set forth in claim 6 further including:
   automatic computer means for calculating independent principal distance corrections $\Delta C_x$ and $\Delta C_y$ and decentrations $\Delta x$ and $\Delta y$;
   and means connected to said computer means for introducing said corrections and decentrations.

8. The apparatus as set forth in claim 7 wherein said electronic computer means comprises apparatus arranged to accept photographic coordinates $x$ and $y$, for points in each photograph and further arranged for operating thereon to produce the aforesaid corrections and decentrations by solving the formulas:
   $\Delta x + C \cdot \tan \phi + y \cdot \sin \omega \cdot \sin \phi$;
   $\Delta y = C \cdot \tan \omega$;
   $\Delta C_x = x \cdot \tan \phi + y \cdot \sin \omega - C \cdot \tan \omega/2 \cdot \sin \omega$; and
   $\Delta C_y = y \cdot \tan \omega + x \cdot \sin \omega - C \cdot \tan \phi/2 \cdot \sin \phi$;
   wherein $\omega$ represents tilt and $\phi$ represents tip of each photograph.

9. The apparatus as set forth in claim 7 wherein said electronic computer means comprises apparatus arranged to accept photographic coordinates $x$ and $y$, for points in each photograph and further arranged for operating thereon to produce the aforesaid corrections and decentrations by solving the formulas:
   $\Delta x = C \cdot \tan \phi + y \cdot \tan \omega \cdot \tan \phi$;
   $\Delta y = C \cdot \tan \omega$;
   $\Delta C_x = x \cdot \tan \phi + y \cdot \tan \omega - C \cdot \tan \omega/2 \cdot \tan \omega$; and
   $\Delta C_y = y \cdot \tan \omega + x \cdot \tan \phi - C \cdot \tan \phi/2 \cdot \tan \phi$;
   wherein $\omega$ represents tilt and $\phi$ represents tip of each photograph.

10. Stereo-photogrammetric apparatus for metric analysis of a model represented by two stereoscopically associated photographs, comprising:
    a. a stereoscope having two optical train stages;
    b. stages for mounting said photographs in position to be viewed through said stereoscope;
    c. means for adjusting the relative positions of said optical train stages and said photograph stages, said means comprising space rod component means, pivotally disposed for operation in horizontal planes to effect said adjustment of said photographic stages and optical train stages;
    d. electrically driven linkage means connecting said space rod component means and said stages for correcting said relative positions of said stages to cmpensate for distortions in said photographs; and
    e. means for computing said corrections and for transmitting signals representative of said corrections to said electrically driven linkage means.

11. Modular stereo-photogrammetric apparatus having in combination a plurality of modules, comprising:
    a. a first module comprising manual control means for causing actuation of subsequent modules, said means including electrical synchro-transmitters for different direction motions, and clutch means for actuating said transmitters;
    b. a second module comprising scanning stereoscope means having electrical synchro-receivers for said motions connected to said synchro-transmitters, said second module further comprising space rod components driven by said receivers for adjusting the positions of said photographs;
    c. a third module comprising electronic computer means for computing independent adjustments of principal distances for, and decentrations in, the $x$ and $y$ directions of each photograph; and
    d. means for receiving signals from said third module representative of said computed adjustments and mechanically applying said adjustments between said space rod components and said photographs.

12. The modular stereo-photogrammetric apparatus of claim 11, further comprising a graphical display module having electrical synchro-receivers connected to said electrical synchro-transmitters of said first module for driving said graphical display module in accordance with movements of said manual control means, and having electrical synchro-transmitters drivably connected to the electrical synchro-recievers of said second module for driving said space rod components in accordance with positions indicated in said graphical display module.

13. In a photogrammetric stereoplotter employing a pair of stage-mounted photographs, means for compensating for radial distortion in the photographs, comprising:
 a. a cam having a contour defined as a function of said radial distortion;
 b. means for viewing points on said photographs;
 c. means for sensing the locations of said viewed points on said photographs;
 d. means connecting said sensing means to said cam; and
 e. electrical means responsive to said contour of said cam for varying the principal distances of said photographs for compensating said radial distortion.

14. The distortion compensation means of claim 13 further comprising:
 adjustable means for varying said contour of said cam.

15. Apparatus for restitution of stereoscopic photographs, said apparatus comprising:
 a. first stage means;
 b. second stage means supported in spaced relation with respect to said first stage means;
 c. orthogonally resolved space rod components for said first and second stage means;
 d. means connecting one of said space rod components to said first stage means, said first stage connecting means including means for moving said first stage means in one direction; and
 e. means connecting the other of said space rod components to said second stage means, said second stage connecting means including means for moving said second stage means in a direction orthogonal to said one direction.

16. Apparatus for restitution of stereoscopic photographs, said apparatus comprising:
 a. $x$ stage means;
 b. $y$ stage means supported in spaced relation with respect to said $x$ stage means;
 c. orthogonally resolved $x$ and $y$ space rod components;
 d. means connecting said $x$ space rod component to said $x$ stage means, said $x$ stage connecting means including means for moving said $x$ stage means in the $x$ direction; and
 e. means for connecting said $y$ space rod component to said $y$ stage means, said $y$ stage connecting means including means for moving said $y$ stage means in the $y$ direction, said $y$ direction being orthogonal to said $x$ direction.

17. Apparatus for restitution of stereoscopic photographs, said apparatus comprising:
 a. first stage means;
 b. second stage means;
 c. means for mounting said first stage means for motion in a first direction;
 d. means for mounting said second stage means for motion in a second direction, said second direction being orthogonal with respect to said first direction;
 e. orthogonally resolved space rod components for said first and second stage means;
 f. means connecting one of said space rod components to said first stage means, said first stage connecting means including means for moving said first stage means in said first direction;
 g. means connecting the other of said space rod components to said second stage means, said second stage connecting means including means for moving said second stage means in said second direction; and
 h. orthogonally resolved means for correcting the principle distance for each photograph, one of said means being supported between said first stage mounting means and said first stage connecting means, the other of said means being supported between said second stage mounting means and said second stage connecting means.

* * * * *